United States Patent
Mori et al.

(10) Patent No.: US 8,264,580 B2
(45) Date of Patent: Sep. 11, 2012

(54) SOLID STATE IMAGING DEVICE, SIGNAL PROCESSING METHOD OF SOLID-STATE IMAGING DEVICE AND IMAGING APPARATUS CAPABLE OF REMOVING VERTICAL SMEARS

(75) Inventors: Tomonori Mori, Kangawa (JP); Nobuo Nakamura, Fukuoka (JP)

(73) Assignee: Sony Corporation, Tokyo (JP)

( * ) Notice: Subject to any disclaimer, the term of this patent is extended or adjusted under 35 U.S.C. 154(b) by 477 days.

(21) Appl. No.: 12/052,399

(22) Filed: Mar. 20, 2008

(65) Prior Publication Data
US 2008/0239124 A1 Oct. 2, 2008

(30) Foreign Application Priority Data
Mar. 30, 2007 (JP) ................................. 2007-092177

(51) Int. Cl.
*H04N 5/335* (2006.01)
*H04N 9/64* (2006.01)

(52) U.S. Cl. ........................................ 348/308; 348/248

(58) Field of Classification Search ........................ None
See application file for complete search history.

(56) References Cited

U.S. PATENT DOCUMENTS

| 6,483,541 B1 * | 11/2002 | Yonemoto et al. | 348/302 |
| 7,417,669 B2 * | 8/2008 | Kurane | 348/222.1 |
| 7,567,277 B2 * | 7/2009 | Inaba et al. | 348/245 |
| 7,679,658 B2 * | 3/2010 | Sakurai et al. | 348/243 |
| 7,701,493 B2 * | 4/2010 | Mauritzson | 348/241 |
| 7,760,258 B2 * | 7/2010 | Huang et al. | 348/294 |

FOREIGN PATENT DOCUMENTS

| JP | 2003-143487 | 5/2003 |
| JP | 2004-015712 | 1/2004 |
| JP | 2005-167918 | 6/2005 |
| JP | 2005-175517 | 6/2005 |
| JP | 2005-223860 | 8/2005 |
| JP | 2005-303648 | 10/2005 |

OTHER PUBLICATIONS

Japanese Office Action dated Mar. 21, 2012 for Japanese Application No. JP 2007-092177.

* cited by examiner

*Primary Examiner* — Luong T Nguyen
(74) *Attorney, Agent, or Firm* — SNR Denton US LLP

(57) ABSTRACT

A solid-state imaging device is disclosed. The device includes: a pixel array unit in which unit pixels including photoelectric conversion elements are two-dimensionally arranged and a first signal and a second signal are outputted to a signal line as a pixel signal; a signal processing unit including a variable gain amplifier, and an analog/digital converter; a signal supply unit supplying a reference signal; plural memory units holds the reference signal passed through the signal processing unit so as to correspond to the plural gains respectively when the variable gain amplifier is set at the plural gains respectively; and a correction unit subtracting the reference signal held in the plural memory units from the pixel signal outputted from each unit pixel in an active pixel area of the pixel array unit and passed through the signal processing unit when the variable gain amplifier is set at the plural gains respectively.

14 Claims, 18 Drawing Sheets

FIG. 9
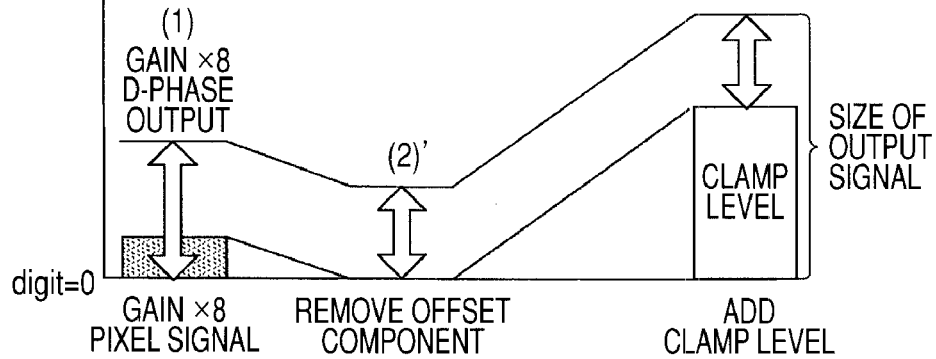
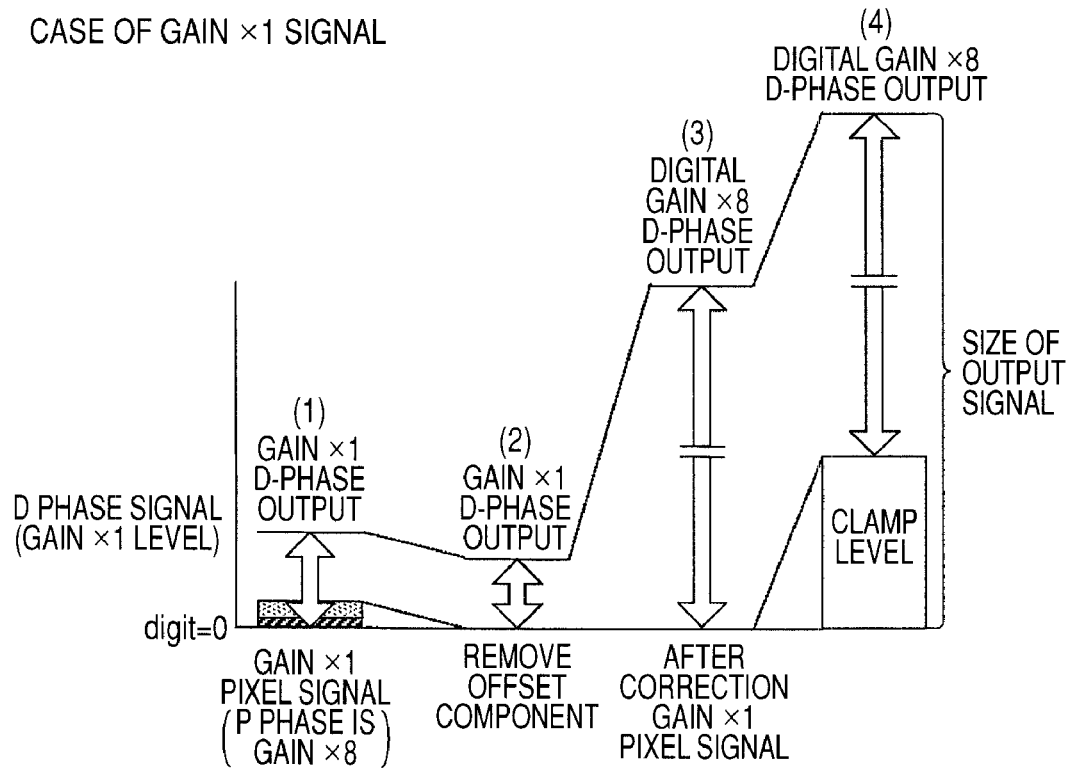

SOLID STATE IMAGING DEVICE, SIGNAL PROCESSING METHOD OF SOLID-STATE IMAGING DEVICE AND IMAGING APPARATUS CAPABLE OF REMOVING VERTICAL SMEARS

CROSS REFERENCE TO RELATED APPLICATIONS

The present invention contains subject matter related to Japanese Patent Application JP 2007-092177 filed in the Japanese Patent Office on Mar. 30, 2007, the entire contents of which being incorporated herein by reference.

BACKGROUND OF THE INVENTION

1. Field of the Invention

The present invention relates to a solid-state imaging device, a signal processing method of the solid-state imaging device and an imaging apparatus, particularly, relates to a so-called column type solid-state imaging device, a signal processing method of the solid-state imaging device and an imaging apparatus using the solid-state imaging device.

2. Description of the Related Art

As a type of the solid-state imaging device, in an amplification type solid-state imaging device as a kind of an X-Y address type solid-state imaging device, for example, a CMOS solid-state imaging device, a technology called as a column type in which independent column processing units are provided at respective pixel columns with respect to the pixel array units in which pixels including photoelectric conversion elements are two-dimensionally arranged in a matrix state, signals (pixel signals) are sequentially read by each pixel row from respective pixels of the pixel array unit and temporarily held in the column processing units, and pixel signals of one row are sequentially read at the prescribed timings.

The column-type CMOS solid-state imaging device includes, as signal processing circuits which process pixel signals of one row read from the column processing unit, for example, an output amplifier amplifying and outputting pixel signals sequentially as voltage signals, a variable gain amplifier amplifying the voltage signals at any of gains among gains which are minutely set, an AD (analog/digital) converter converting the pixel signals whose voltages are amplified into digital signals.

In this kind of solid-state imaging device, the AD converters having 12-bit precision, 14-bit precision and the like are generally developed and used. When the number of bits of the AD converter is increased, the power consumption is increased, therefore, it is drastically difficult to improve the bit precision further due to noise included in the circuit itself. Accordingly, in the column type solid-state imaging device of related arts, it is difficult to improve the bit precision and difficult to expand the dynamic range while keeping S/N in good condition.

As a measure of the above problem, there is proposed a column-type CMOS solid-state imaging device which expands the dynamic range of signals of one screen while keeping S/N in good condition by including a configuration in which a pixel signal amplification unit is provided at each pixel column of the pixel array unit, the size of the pixel signal is detected and again is set to the pixel signal amplification unit according to the size of the signal, as well as processing of correcting the gain set in the pixel signal amplification unit at each pixel column is performed with respect to a digital pixel signal which is AD converted in the converter, thereby expanding the dynamic range of signals of one screen while keeping S/N in good condition (for example, refer to JP-A-2005-175517 (Patent Document 1)).

Additionally, there is also proposed a column-type CMOS solid-state imaging device in which a pulse signal having the size in the time axis direction (pulse width) corresponding to the size of a pixel signal by comparing the pixel signal with a reference signal of the ramp waveform in a comparator in the column processing unit provided at each pixel column of the pixel array unit, a prescribed clock is counted by a counter in a period of the pulse width of the pulse signal and AD conversion is performed to the counted value by allowing the counted value to be a digital signal according to the size of the pixel signal (for example, refer to JP-A-2005-303648 (Patent Document 2)).

In the above CMOS solid-state imaging device, a so-called digital CDS (Correlated Double Sampling) processing is performed, in which a noise component (hereinafter referred to as a "P phase signal") outputted just after the reset from pixels is counted down, and a true signal component (hereinafter, referred to as a "D phase signal") according to the received light amount outputted from the pixels after that is counted up by using an up/down counter as the counter, and the difference between the P phase signal and D phase signal is taken to remove noise components such as fixed pattern noise or reset noise.

SUMMARY OF THE INVENTION

In the case that the technology described in Patent Document 1 is applied to the solid-state imaging device having the above-described digital CDS processing function is included in the column processing unit, a variable gain amplifier is provided at the input side of the comparator and the gain of the variable gain amplifier is set according to the size of pixel signals. However, in this case, it is difficult to determine a gain magnification of the variable gain amplifier when performing the digital CDS processing, a gain mismatch occurs between the P phase and D phase (details thereof will be described later).

The gain mismatch generated between the P phase and the D phase generates variations depending on the variable gain amplifier, which causes image quality defects as vertical smears in images. In addition to image quality defects by the vertical smears, the gain mismatch occurs between the P phase and the D phase due to various factors in circuit systems, wiring and the like from the pixel array area to the comparator even when images are taken in a black state at a fixed gain, which causes offset. The offset components are superimposed on the gain mismatch which is the cause of vertical smears, therefore, vertical smears become complicated and image quality will further deteriorate in low luminance.

It is desirable to provide a solid-state imaging device, a signal processing method of the solid-state imaging device and an imaging apparatus capable of removing vertical smears caused by the gain mismatch generated between the P phase and the D phase to improve image quality.

According to an embodiment of the invention, a solid-state imaging device including a pixel array unit in which unit pixels including photoelectric conversion elements are two-dimensionally arranged in a matrix state and a first signal at the time of reset of the unit pixel and a second signal corresponding to electric charges obtained by the photoelectric conversion in the photoelectric conversion element are outputted to a signal line as a pixel signal, and a signal processing unit having a variable gain amplifier amplifying the pixel signal at plural gains in accordance with the size of the pixel signal outputted from the unit pixel and supplied through the signal line, and an analog/digital converter converting the pixel signal amplified in the variable gain amplifier into a digital signal, has a configuration in which a reference signal to be the reference of the pixel signal is supplied to the signal line and the reference signal passed through the signal processing unit is held in plural memory units corresponding to the plural gains respectively when the variable gain amplifier is set at the plural gains respectively, and the reference signal held in the plural memory units respectively so as to correspond to the plural gains is subtracted from the pixel signal outputted from each unit pixel in an active pixel area of the pixel array unit to the signal line and passed through the signal processing unit when the variable gain amplifier is set at the plural gains respectively.

In order to provide a clear understanding, the plural gains of the variable gain amplifier are, for example, two gains, namely, a first gain and a second gain. In the case that the variable gain amplifier is set at the first and second gains respectively, when the reference signal is passed through the signal processing unit, an offset component caused by passing through the signal processing unit is superimposed on the reference signals at the time of the first gain and at the time of the second gain. The reference signal at the time of the first gain and reference signal at the time of the second gain including the offset component are held in corresponding memory units as correction values respectively. The correction values held in the memory units are subtracted from the pixel signals outputted from respective unit pixels in an active pixel area of the pixel array unit to the signal line and passed through the signal processing unit when the variable gain amplifier is set at the first and second gains respectively, thereby removing the offset component caused by passing through the signal processing unit.

According to the embodiments of the invention, the offset component caused by passing through the signal processing unit including the variable gain amplifier and the AC converter is removed, thereby removing the vertical smear noise component caused by the offset component, as a result, image quality can be improved.

BRIEF DESCRIPTION OF THE DRAWINGS

FIG. 9 is a conceptual diagram of processing of respective units of the multiplexer according to Embodiment 1;

DESCRIPTION OF THE PREFERRED EMBODIMENTS

Hereinafter, embodiments of the invention will be explained in detail with respect to the drawings.

Figure 1:
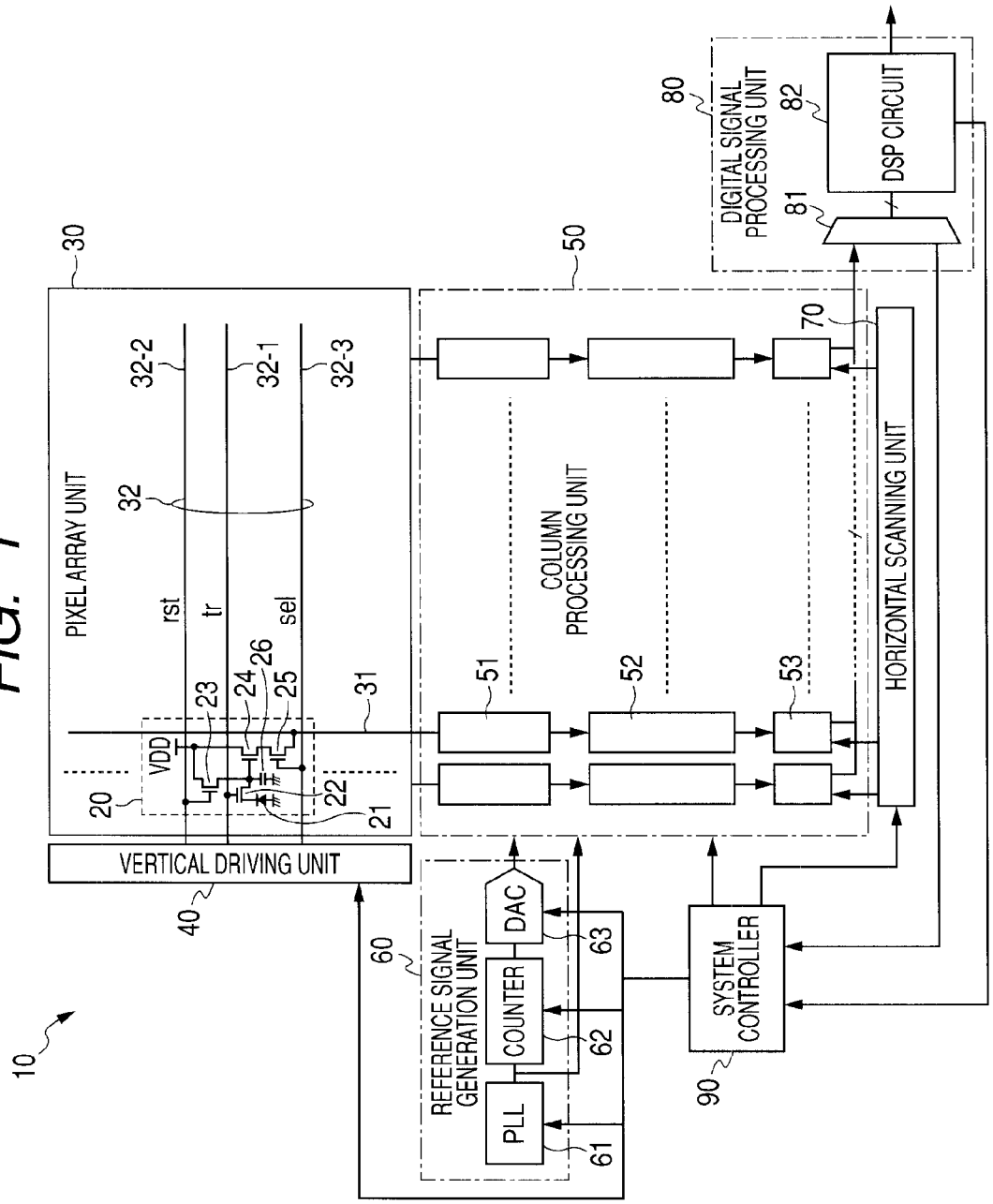
FIG. 1 is a block diagram showing an outline of a configuration of an amplification type solid-state imaging device according to an embodiment of the invention.

FIG. 1 is a block diagram showing an outline of a configuration of an amplification type solid-state imaging device according to an embodiment of the invention. In this case, a CMOS solid-state imaging device will be explained as an example of the amplification solid-state imaging device. The invention is not limited to the application to the CMOS solid-state imaging device and can be applied to all amplification type solid-state imaging devices such as a MOS type solid-state imaging device.

As shown in FIG. 1, a CMOS solid-state imaging device 10 according to the embodiment includes a pixel array unit 30 in which unit pixels 20 (hereinafter, sometimes written as merely "pixels") including photoelectric conversion elements are two-dimensionally arranged in a matrix state, a vertical driving unit 40, a column processing unit 50, a reference signal generation unit 60, a horizontal scanning unit 70, a digital signal processing unit 80 and a system controller 90 and the like.

(Pixel Unit)

The unit pixel 20 has a circuit configuration including a photoelectric conversion element, that is, for example, a photodiode 21, and four transistors of a transfer transistor 22, a reset transistor 23, an amplification transistor 24 and a selection transistor 25. Here, a case in which, for example, N-channel MOS transistors are used as transistors 22 to 25 is cited as an example.

The photodiode 21 converts light into electric charges (electrons in this case) by photoelectric conversion, accumulating electric charges until transferred by the transfer transistor 22.

The transfer transistor 22 is connected between a cathode electrode of the photodiode 21 and a FD (floating diffusion)

region 26, transferring electric charges photoelectrically converted in the photodiode 21 and accumulated here to the FD region 26.

In the reset transistor 23, a drain electrode is connected to a power supply VDD and a source electrode is connected to the FD region 26 respectively. The reset transistor 23 resets the potential of the FD region 26 before the transfer of signal charges from the photodiode 21 to the FD region 26, outputting a p-phase signal (reference signal of the pixel 20) to the amplification transistor 24. The reset transistor 23 is turned on at the same time as the transfer transistor 22, thereby completely transferring electric charges of the photodiode 21 and allowing the photodiode 21 to be reset.

In the amplification transistor 24, a gate electrode is connected to the FD region 26 and a drain electrode is connected to the power supply VDD respectively. The amplification transistor 24 allows the pixel signal to flow in the vertical signal line 31 as current according to the voltage of the FD region 26. At this time, the amplification transistor 24 amplifies electric charges of the FD region 26.

The selection transistor 25 is connected between a source electrode of the amplification transistor 24 and the vertical signal line 31 arranged at each pixel column, electrically connecting between the source electrode of the amplification transistor 24 and the vertical signal line 31, synthesized with vertical scanning by the vertical driving unit 40.

The FD region 26 is a parasitic capacitor connected to the gate electrode of the amplification transistor 24, controlling current allowed to flow in the amplification transistor 24 in accordance with the voltage generated by the accumulated electric charges. The potential of the FD region 26 varies according to variation of the charge amount by on/off of the transfer transistor 22 and the reset transistor 23.

The unit pixel 20 is not limited to the one having the circuit configuration including four transistors of the transfer transistor 22, the reset transistor 23, the amplification transistor 24 and the selection transistor 25, and it is preferable to use the unit pixel 20 having three-transistor configuration in which the selection transistor 25 is omitted and the function of the selection transistor 25 is given to the amplification transistor 24.

(Pixel Array Unit)

The pixel array unit 30 is an aggregate of unit pixels 20 of m-rows x n-columns, and vertical signal lines 31 are arranged at respective pixel columns with respect to the m-rows×n-columns pixel arrangement as well as plural driving lines 32 driving the unit pixels 20 are arranged at respective pixel rows.

In FIG. 1, in order to simplify the drawing, only the vertical signal line 31 at a certain pixel column and plural driving lines 32 of certain pixel rows are shown, and only the circuit configuration of one unit pixel 20 positioned at the intersection of these lines is shown.

As the plural driving line 32, for example, a transfer driving line 32-1 driving the transfer transistor 22, a reset driving line 32-2 driving the reset transistor 23, a selection driving line 32-3 driving the selection transistor 25 and the like are arranged.

The pixel array unit 30 has generally a configuration in which a pixel portion outputting pixel signals used as imaging signals is an active pixel area, and also has an optical black pixel area around the active pixel area outputting a reference signal to be the reference of pixel signals (for example, black level) which is shielded so that external light is not incident.

(Vertical Driving Unit)

The vertical driving unit 40 includes a shift resister, an address decoder and the like, selectively scanning respective pixels 20 in the pixel array unit 30 at each row, as well as performing to the pixels 20 in the selected row reset driving of the reset transistor 23, transfer driving of the transfer transistor 22 and selection driving of the selection transistor 25.

More concretely, the vertical driving unit 40 controls the transfer transistor 22 by each row by a transfer pulse "tr", transferring electric charges accumulated in the photodiode 21 to the FD region 26. The vertical driving unit 40 also controls the reset transistor 23 by each row by a reset pulse "rst", resetting the potential of the FD region 26. Further, the vertical driving unit 40 controls the selection transistor 25 by each row by a selection pulse "sel", outputting pixel signals from the amplification transistor 24 by each row to the vertical signal line 31.

The vertical driving unit 40 performs driving control of respective unit pixels 20 of the selected row so as to output a P phase signal which is a reference signal when resetting the potential in the FD region 26 by the reset transistor 23 and a D phase signal (true signal component) which varies by the electric charges photoelectrically converted and accumulated in the photodiode 21 at different timings to the vertical signal line 31.

(Column Processing Unit)

The column processing unit 50 includes circuit portions arranged at each pixel column in the pixel array unit 30.

Figure 2:
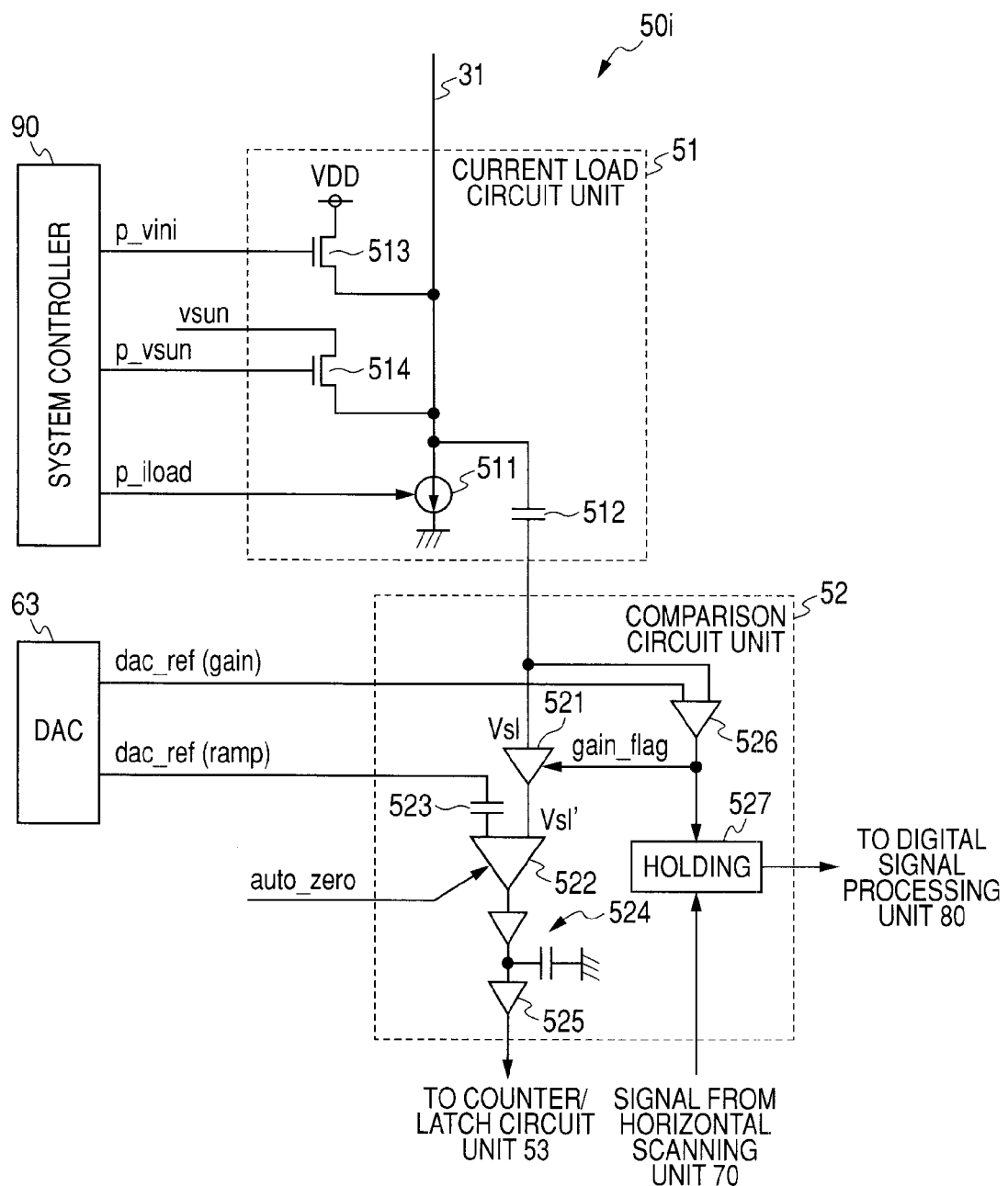
FIG. 2 is a circuit diagram showing an example of a specific configuration of a column processing unit with respect to a certain pixel column.

FIG. 2 is a circuit diagram showing an example of a specific configuration of circuit portions with respect to a certain pixel column "i". In this case, the circuit portions in the certain pixel column "i" is written as a "column processing unit 50i". As shown in FIG. 2, the column processing unit 50i includes a current load circuit unit 51, a comparison circuit unit 52 and a counter/latch circuit 53.

(Current Load Circuit Unit)

The current load circuit unit 51 includes a current source 511, a capacitor 512 and two MOS transistors 513, 514, taking a P phase signal and a D phase signal from each unit pixel of the pixel row selected by the vertical driving unit 40 as a form of current to transmit them to the comparison circuit unit 52 as pixel signals.

The current source 511 forms a source follower with the amplification transistor 24 of the unit pixel 20 by being connected between the vertical signal line 31 and a reference potential node (for example, a ground node), generating bias current to be supplied to the amplification transistor 24.

The capacitor 512 is inserted in serial with respect to the vertical signal line 31, extracting only an alternating component in the pixel signal supplied from the amplification transistor 24 of the unit pixel 20 through the vertical signal line 31 to transmit it to the comparison circuit unit 52.

The MOS transistor 513 is a switching element connected between the power supply VDD and the vertical signal line 31 to perform switching operation, initializing the potential of the vertical signal line 31 so that the P-phase period starts in the same state constantly.

The MOS transistor 514 is a switching element fixing the potential of the vertical signal line 31 in the P-phase period, giving a potential VSUN for preventing the difference between the P-phase signal level and D-phase signal level from being small to the vertical signal line 31 when the potential of the FD region 26 of the unit pixel 20 is decreased due to blooming and the like.

The driving of the current source 511 and the two MOS transistors 513, 514 are respectively executed under control of the system controller 90. Specifically, a control signal p_iload is supplied to the current source 511, and control signals p_vini, p_vsun are supplied to the MOS transistors 513, 514 from the system controller 90.

(Comparison Circuit Unit)

The comparison circuit unit 52 includes a variable gain amplifier 521 having a programmable gain amplifier (PGA) and the like, a comparator 522, a capacitor 523, a low-pass filter (LPF) 524, a buffer 525, a gain detector 526 and a gain-flag holding circuit 527.

The variable gain amplifier 521 amplifies a pixel signal level Vsl given from the vertical signal line 31 through the capacitor 512 at a gain of m-times or a gain of n-times (m, n are arbitrary integers) in accordance with a setting of a gain setting signal (flag) gain_flag given from the gain detector 526.

The comparator 522 compares a pixel signal level Vsl' outputted from the variable gain amplifier 521 with a reference signal dac_ref (ramp) of a ramp waveform given from a later described DAC (digital/analog converter) 63 through the capacitor 523, setting (outputting) a flag signal at a point when the pixel signal level Vsl' and the reference signal dac_ref (ramp) correspond.

The lowpass filter 524 performs operation of eliminating chattering of comparison output from the comparator 522. The buffer 525 performs operation of allowing sufficient drive ability with respect to the fan-out of a later stage.

The gain detector 526 compares the pixel signal level, i.e. the strength of the pixel, (pixel signal size) Vsl given from the vertical signal line 31 with a judgment reference level dac_ref (level) of a direct-current signal given from the DAC 63 (or a direct-current signal of several steps), and transmits a gain setting signal gain_flag designating gain switching to the variable gain amplifier 521 when the pixel signal level Vsl crosses the judgment reference level dace_ref (level).

The gain-flag holding circuit 527 temporarily holds the gain setting signal gain_flag outputted from the gain detector 526 as well as outputs it to the digital signal processing unit 80, synchronized with a signal from the horizontal scanning unit 70 (synchronized with horizontal transfer/horizontal scanning) when gain correction is performed in the later-described digital signal processing unit 80.

(Counter/Latch Circuit Unit)

Figure 3:
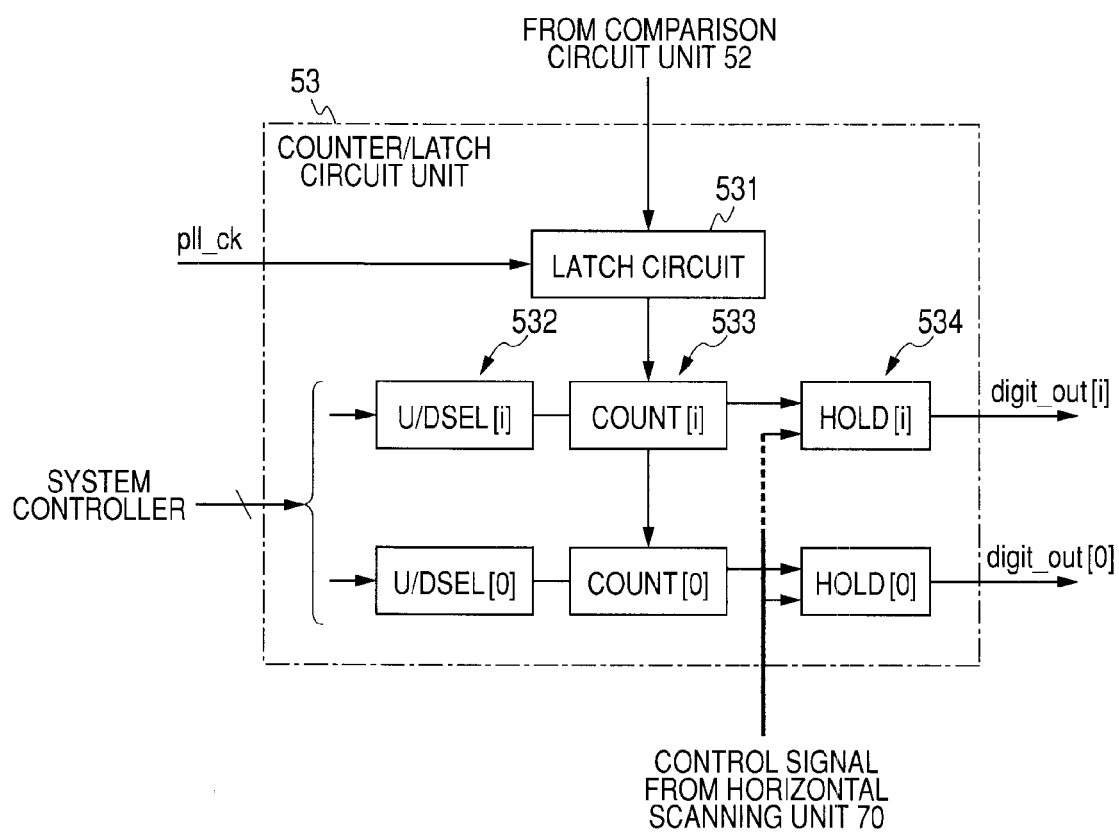
FIG. 3 is a block diagram showing an example of a specific configuration of a counter/latch circuit unit.

FIG. 3 is a block diagram showing an example of a specific configuration of the counter/latch circuit unit 53. The counter/latch circuit unit 53 counts a synchronization signal pll_ck supplied from a later-described PLL (Phase Locked Loop) circuit 61 and stops the counting operation by the synchronization signal pll_ck when the flag signal is supplied from the comparison circuit unit 52 to fix the pixel signal level Vsl at a digital value.

As shown in FIG. 3, the counter/latch circuit unit 53 includes a latch circuit 531, an up/down selection circuit group 532, an up/down counter group 533 and a holding circuit group 534.

The latch circuit 531 sends the synchronization signal pll_ck supplied from the PLL circuit 61 to the up/down counter 533 in accordance with the state of the flag signal supplied from the comparison circuit unit 52 (whether the flag signal is set or not).

The up/down selection circuit group 532 selects whether the up/down counter group 533 is allowed to count up or count down based on control information supplied from the system controller 90.

The up/down counter group 533 continues the counting operation, synchronized with the synchronization signal pll_ck while the synchronization signal pll_ck is supplied from the PLL circuit 61 through the latch circuit 531. In the up/down counter group 533, digital CDS processing is performed by performing subtraction between the D phase signal and the P phase signal, counting down the P phase signal and counting up the D phase signal.

In the up/down counter group 533, up/down counters [i]-[o] corresponding to the number of bits for resolution of the CDS and positive-negative judgment are arranged. The up/down counter group 533 has a configuration of asynchronous adder, in which a switching signal of (j−1) digits will be a clock of the counter of (j) digits.

The holding circuit group 534 holds (latches) count values when respective counters of the up/down counter group 533 stop the counting operation, that are, digital values in the pixel signal level Vsl, and delivers digital signals digit_out to the digital signal processing unit 80 at the next stage in the form of current under control of the horizontal scanning unit 70. The digital signals digit_out are transferred in the form of current in this manner, thereby increasing speed of transfer and improving noise reduction.

As apparent from the above, the counter/latch circuit unit 53 has the configuration in which circuits are divided into some groups according to the column and digital values are outputted in parallel in order to delay the driving frequency when the digital values in the pixel signal level Vsl held in the holding circuit group 534 are transferred to the digital signal processing unit 80 of the next stage in the form of current under control of the horizontal scanning unit 70.

In the column processing unit 50, the comparison circuit unit 52 and the counter/latch circuit unit 53 has a function of AD-converting an analog pixel signal supplied from the pixel array unit 30 through the vertical signal line 31 and the current load circuit unit 51 into a digital pixel data. Accordingly, the CMOS solid-state imaging device 10 according to the embodiment is an image sensor of a column AD conversion type.

(Reference Signal Generation Unit)

The explanation is returned to FIG. 1. The reference signal processing unit 60 includes a PLL circuit 61, a counter 62 and a DAC (digital/analog converter) 63.

The PLL circuit 61 generates a clock signal having a frequency calculated by multiplying a reference clock given from the outside, supplying the clock signal to the counter 62 and the counter/latch circuit 53 as the synchronization signal.

The counter 62 outputs a digital signal for generating a reference signal of the ramp waveform in the DAC 63 by performing counting operation, synchronized with the synchronization signal from the PLL circuit 61. The DAC 63 generates a reference signal dac_ref (ramp) of the ramp waveform and supplies it to the comparator 522 of the comparison circuit unit 52 based on the digital signal outputted from the counter 62.

The DAC 63 generates, in addition to the reference signal dac_ref (ramp) of the ramp waveform, a judgment reference signal dac_ref (level) for judging the signal level of the pixel signal Vsl and supplies it to the gain detector 526 of the comparison circuit unit 52.

(Horizontal Scanning Unit)

The horizontal scanning unit 70 includes a shift resister, an address decoder and the like, supplies a control signal to the counter/latch circuit unit 53 of a corresponding column, which transfers the digital value in the pixel signal level stored in the counter/latch circuit unit 53 of a particular column in the column processing unit 50 to the digital signal processing unit 80.

(Digital Signal Processing Unit)

The digital signal processing unit 80 includes a multiplexer 81 and a DSP (digital signal processor) circuit 82.

In the digital signal processing unit 80, the multiplexer 81 converts the digital value digital_out in the pixel signal level received from the column processing unit 50 in the form of current into voltage, performing various digital processing to the digital pixel data.

Specifically, the multiplexer 81 performs processing such as addition, division of pixel signals in the vertical direction, application of variable digital gain at the time of addition, offset addition, insertion of a synchronization code, data skipped output processing for measurement, sorting of data for integrating plural channel inputs and reducing output terminals, and generation of various clocks.

The DSP circuit 82 performs digital processing such as correction of pixel defects, interpolation processing, output of a feedback control signal supplied to the system controller 90, conversion of a pixel signal into an arbitrary output format from digital values of pixel signals outputted from the multiplexer 81.

(System Controller)

The system controller 90 generates signals controlling respective circuit units around the pixel array unit 30 in accordance with the feedback control signal supplied from the DSP circuit 82. Specifically, the system controller 90 generates a timing signal performing drive control of the vertical driving unit 40, a control signal p_iload performing control of a current source 511 of the current load circuit unit 51, control signals p_vini, p_vsun performing control of the two MOS transistors 513, 514, a control signal performing control of the horizontal scanning unit 70 and the like.

[Noise Under Low-Luminance Condition]

In the CMOS solid-state imaging device, quantization noise when the analog pixel signal Vsl supplied from the unit pixel 20 through the vertical signal line 31 is converted into digital pixel data is constantly fixed regardless of low luminance or high luminance. Therefore, effect of random noise of the comparator 522 itself in the column processing unit 50 is also superimposed on a subject imaged under a light source of low luminance, as a result, S/N deteriorates and flicker of a screen becomes significant.

Optical shot noise included in a signal from the unit pixel 20 is represented by the following formula.

$$Nn=\sqrt{Ns}$$

Ns denotes the number of photons incident in the unit pixel 20, Nn denotes the number of photons to be the cause of optical shot noise.

For example, if the ratio of the signal just before the comparator 522/the number of electrons photoelectrically converted (conversion efficiency) is 100 μV/e−, when the input signal is 1000 mV, the corresponding number of electrons is 1000, the number corresponding to the optical shot noise is 100, therefore, the signal just before the comparator 522 is 10 mVrms and S/N is 40 dB.

However, when the input signal decreases to 10 mV, the corresponding number of electrons is 100, the number corresponding to the optical shot noise is 10, accordingly, the signal just before the comparator 522 is 1 mVrms and S/N is decreased to 20 dB.

In the case that an AD converter of 1V in full range having resolution of 10-bit in the state that the input signal is 10 mV, 1 LSB is nearly 1 mV, and 2 LSB will be noise components at the maximum. Accordingly, S/N deteriorates to 14 dB.

Figure 4:
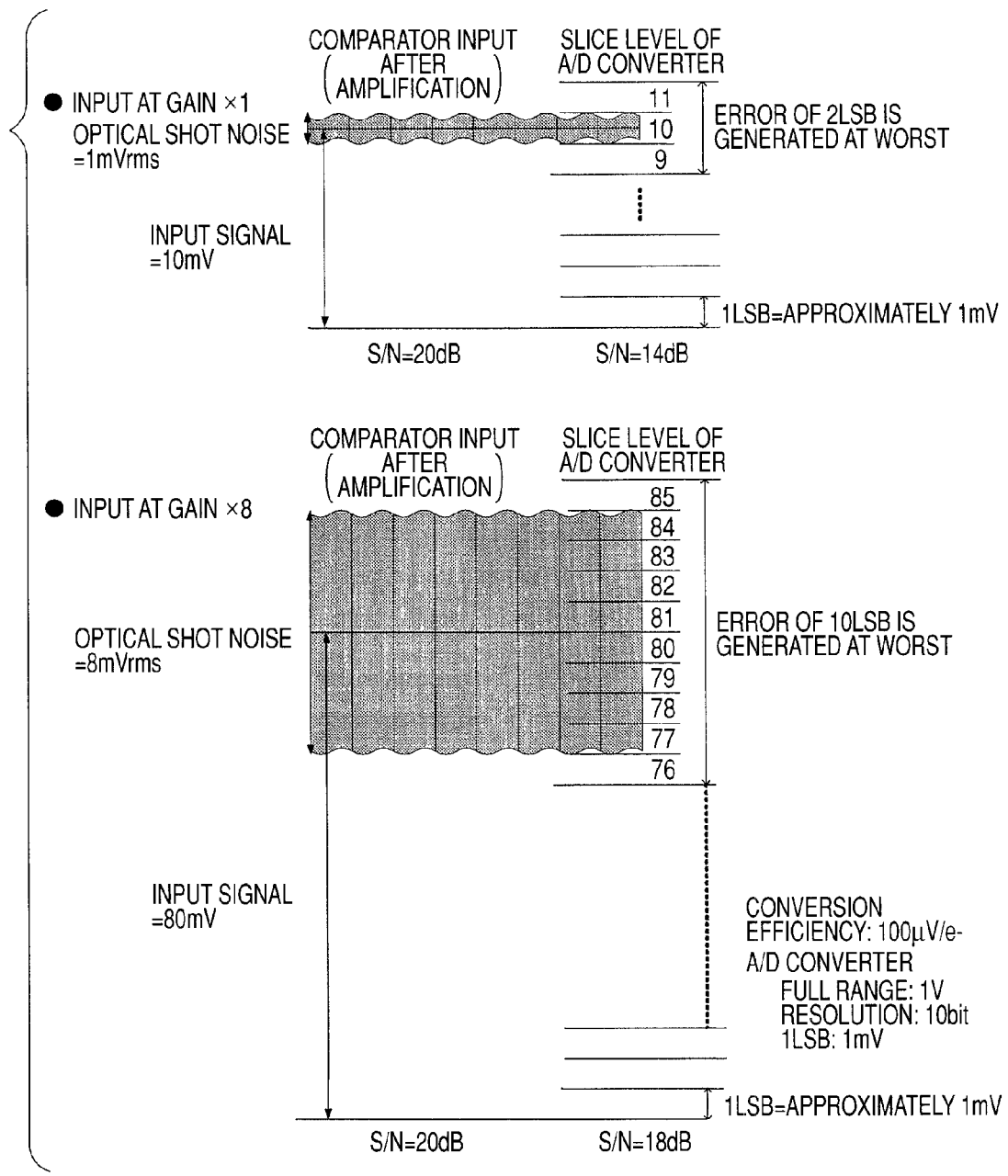
FIG. 4 is a schematic diagram explaining noise reduction effect when an input signal is made to be eight times larger.

Here, a case that the input signal is made to be n-times larger, for example, a case of eight-times is considered. FIG. 4 is a schematic diagram explaining noise reduction effect when the input signal is made to be eight times larger.

In the S/N of the input signal, the optical shot noise is also amplified, therefore, noise will be 8 Vrms. In this case, 1 LSB remains at 1 mV, therefore, 8 LSB will be noise components.

Since the signal component is also amplified, output will be 80 LSB and S/N remains at 20 dB.

As can be seen from the example, the effect from pixels in a low-luminance area can be decreased with respect to quantization noise of the A/D converter of the later stage by allowing the input signal to be n-times larger, finally, noise under the low-luminance condition can be reduced.

In view of the above, the CMOS solid-state imaging device 10 according to the embodiment has been made. As explained in FIG. 2, the CMOS solid-state imaging device 10 according to the embodiment includes the variable gain amplifier 521 at the previous stage of the comparator 522 as well as the gain detector 526 judging whether the gain of the variable gain amplifier 521 is made to be m-times larger (for example, ×1) or n-times (for example, ×8) larger based on the pixel signal level Vsl in the comparison circuit unit 52 of the column processing unit 50.

Figure 5:
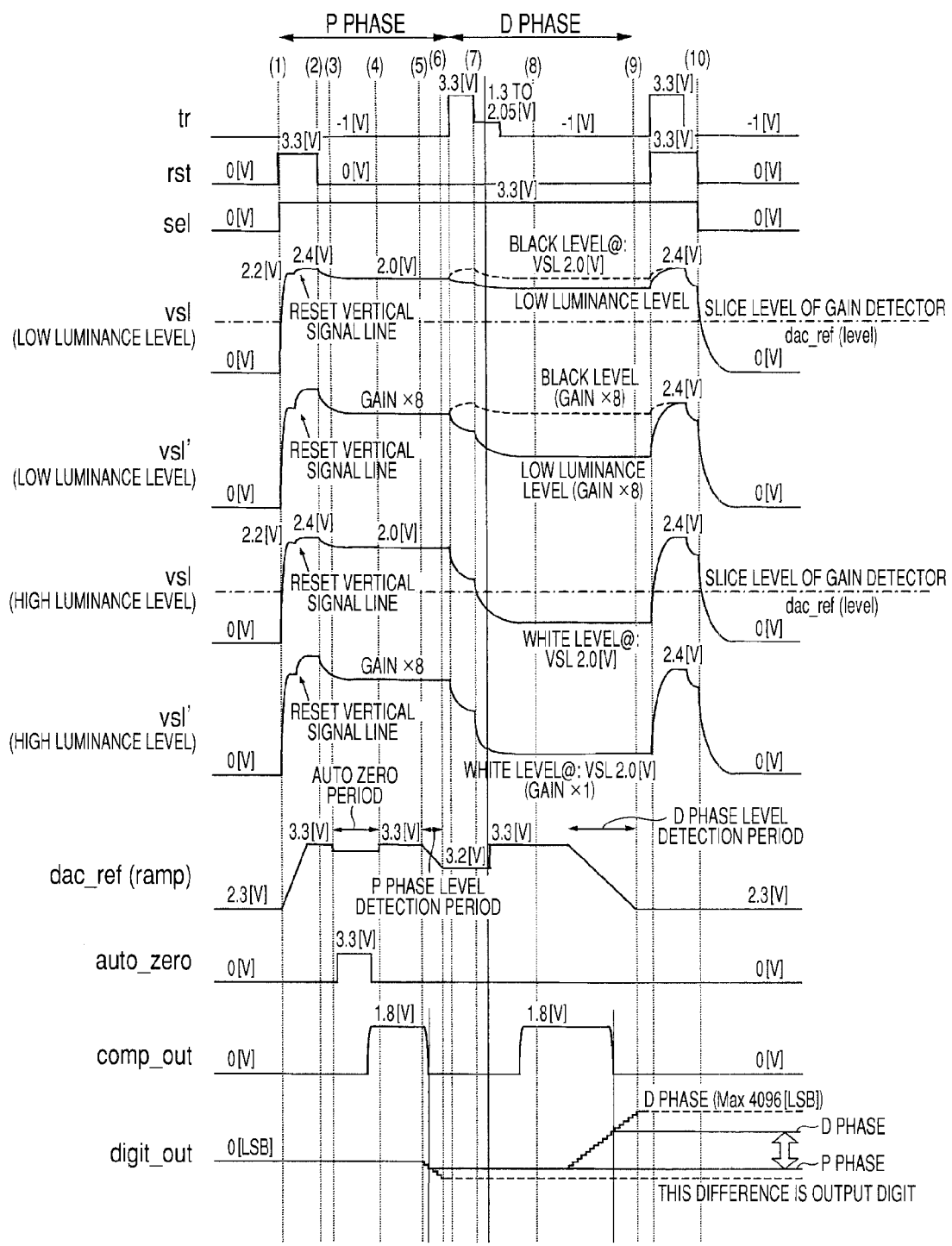
FIG. 5 is a waveform chart showing an example of output signals when a comparison circuit is operated in the case of low luminance and in the case of high luminance, respectively.

In FIG. 5, an example of output signals when the comparison circuit unit 52 having the above configuration is operated is shown in the case of low luminance and in the case of high luminance, respectively.

In FIG. 2, the pixel signal level Vsl is inputted from the vertical signal line 31 to one input end of the gain detector 526, and a current signal from the DAC 63 (or a current signal of several steps) is given to the other input end as a judgment reference level dac_ref (level). The gain detector 526 transmits a gain setting signal gain_flag instructing the gain switching to the variable gain amplifier 521 when the pixel signal level Vsl crosses a judgment reference level dac_ref (gain).

The variable gain amplifier 521 amplifies the pixel signal level Vsl at a gain of m-times (for example, ×1) or n-times (for example, ×8) in accordance with the setting of the gain setting signal gain_flag from the gain detector 526. Then, in the comparator 522, the pixel signal level Vsl is compared with the reference signal dac_ref (ramp) of the ramp waveform given from the DAC 63 based on the amplification result of the variable gain amplifier 521.

The gain setting signal gain_flag outputted from the gain detector 526 is temporarily held in the gain-flag holding circuit 527. Then, the gain setting signal gain_flag is transferred to the digital signal processing unit 80, synchronized with an output digital signal digit_out when performing gain correction in the digital signal processing unit 80 in accordance with the horizontal transfer by the control of the horizontal scanning unit 70.

In the case of performing gain switching of several steps, it is necessary to add the corresponding number of judgment reference levels dac_ref (level) and circuits which instruct gains when crossing respective judgment reference levels. Hereinafter, for simplification, explanation will be made, allowing the setting of magnification of the gain to be two-stage switching, namely, ×1 and ×8 as in the examples of FIG. 4 and FIG. 5.

In the example of FIG. 5, the judgment reference level dac_ref (level) may be the direct-current level. However, it is necessary to adjust the level in applications such as correction of process variations, certification at the time of evaluation, therefore, it is preferable that the judgment reference level dac_ref (level) from a circuit which is capable of adjusting the level as well as having a drive ability capable of driving the gain detectors 526 of all columns.

The signal outputted form the comparator 522 receives the digital AD conversion and the digital CDS processing in the counter/latch circuit unit 53. Then, horizontal transfer in the form of current of the digital value digit_out of the pixel signal level Vsl is executed under control of the horizontal scanning unit 70. At this time, the above gain setting signal gain_flag is also supplied to the multiplexer 81 of the digital signal processing unit 80, synchronized with the horizontal scanning.

In the case of gain×8 in the gain setting signal gain_flag, the digital value digital_out outputted from the column processing unit 50 will not change, however, in the case of gain×1, the digital value digital_out is changed so as to be gain×8.

At this time, a binary signal can be obtained only by adding n-pieces of "0" at the lower bit when the numeric value to be multiplied is the n-th power of 2, therefore, changing processing of the digital value is easy. As the numeric value is 8 in the example of FIG. 5, the digital value can be easily changed to eight times by further adding "0" of three digits at the side of LSB of the digital value.

As described above, the gain of the low level signal (low-luminance signal) is increased to ×n, for example, ×8 at the comparison in the comparator 522, thereby improving S/N with respect to the quantization noise of the low level signal. Specifically, the gain of the pixel signal level Vsl in the low level is increased, thereby reducing the quantization noise generated by random noise.

In addition, the number of bits can be increased without increasing the number of bits of the counter (533) of the column processing unit 50, as well as the gradient and the level of the reference signal dac_ref (ramp) of the ramp waveform generated in the DAC 63 is adjusted, thereby further expanding the dynamic range.

[Problems When Performing Digital CDS Processing]

Here, problems when performing the digital CDS processing will be considered. In the comparison circuit unit 52, it is difficult to judge whether the gain is set to ×1 or ×8 until the timing of D phase. Accordingly, which magnification is set to the gain of P phase will be a significant problem.

Figure 6:
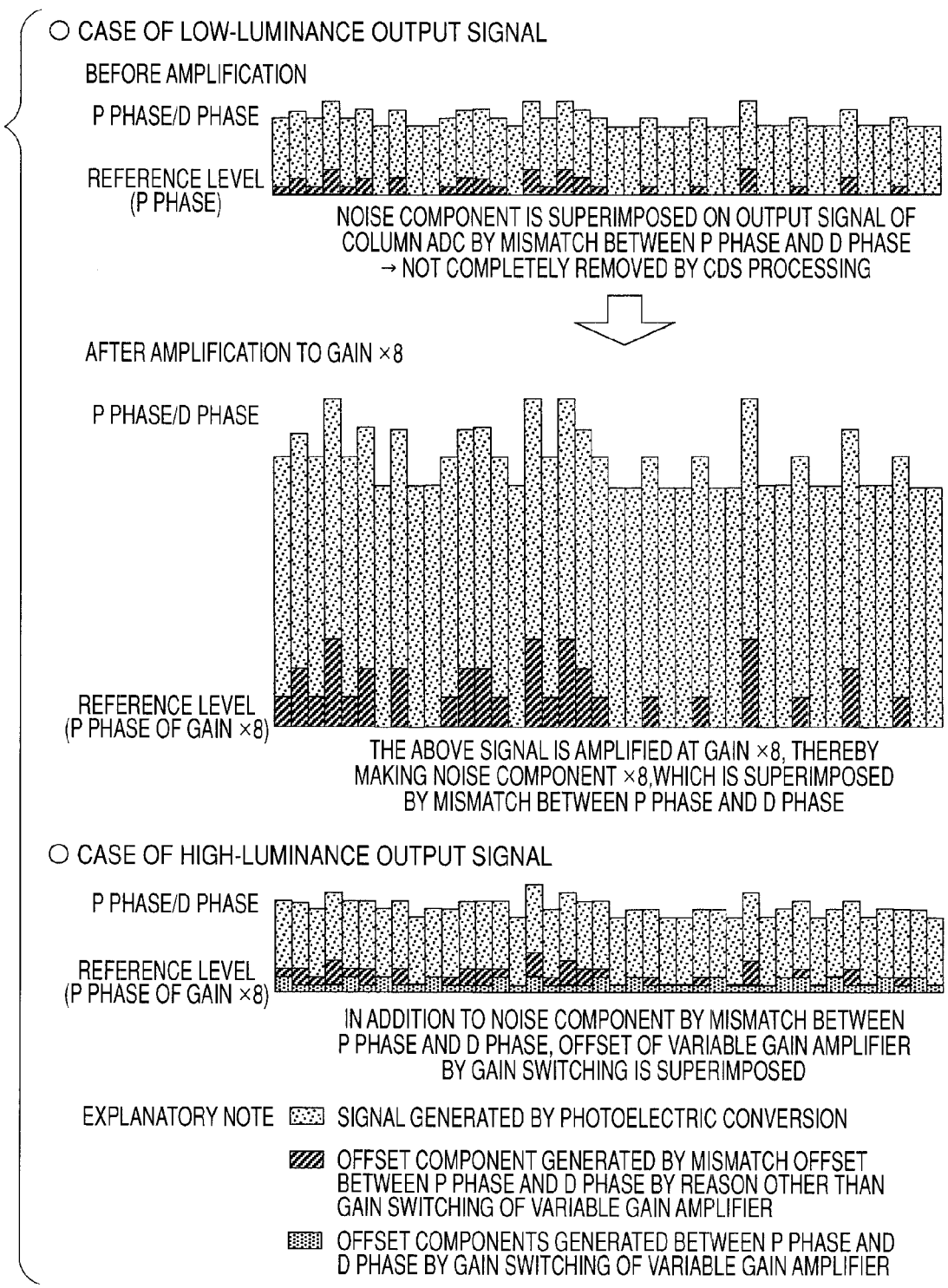
FIG. 6 is a level diagram showing the state in which gain mismatch is generated between a P phase and a D phase.

An offset is generated between the case in which the gain is set to ×1 and the case in which the gain is set to ×8, therefore, in the case that the signal of the ×1 fixed gain at the time of P phase is compared with the signal of ×8 gain, an offset component caused between the ×1 gain and ×8 gain is superimposed and a mismatch of gains (gain error) is generated between the P phase and the D phase. The state is shown in FIG. 6. In the example of FIG. 6, explanation is made under conditions in which gain switching is performed between ×1 and ×8, and the P phase is fixed to ×8.

In the case of low luminance, a noise component due to the mismatch between the P phase and the D phase is superimposed on the output signal digit_out of the column ADC before amplification, therefore, it is difficult to completely remove the noise component by the digital CDS processing. After amplification to the gain×8, the signal including the noise component is amplified at the gain×8, therefore, the noise component also becomes eight times greater. In the case of high luminance, in addition of the noise component due to the mismatch between the P phase and the D phase, an offset component due to the gain switching by the variable gain amplifier 521 is also superimposed.

As described above, in the setting in which the output gain of the D phase from the unit pixel 20 is ×1, the mismatch of gains is generated between the P phase and D phase, and the gain mismatch generates variations depending on the variable gain amplifier 521, which causes image quality defects, represented by vertical smears in the image.

In addition to the image quality defects due to vertical smears, even in the case of imaging in a black state by the fixed gain, the mismatch of gains is usually generated between the P phase and the D phase because of various causes such as circuit systems or wiring at portions from the pixel array unit 30 to the comparator 522, which generates the offset. The offset component is superimposed on the gain mismatch to be the cause of the vertical smears, therefore, the vertical smears will be complicated and the image quality will further deteriorate in low luminance.

[Features of the Embodiment]

In the embodiment, in the CMOS solid-state imaging device 10 having the configuration in which the digital CDS processing function is given to the column processing unit 50 as well as the variable gain amplifier 521 is provided at the input side of the comparator 522 in the column processing unit 50, setting the gain of the variable gain amplifier 521 according to the size (level) of the pixel signal, the vertical smears caused by the gain mismatch generated between the P phase and D phase is removed to improve image quality according to the following configuration and operation thereof.

Specifically, while the reference signal to be the reference for the pixel signal is supplied to the vertical signal line 31, the gain of the variable gain amplifier 521 with respect to the reference signal is switched to arbitrary magnifications of m-times and n-times, as well as a digital value obtained by performing the AD conversion and the digital CDS processing is stored in a memory (storage unit) as a correction value for correcting the offset component (gain error between the P phase and the D phase) generated by passing through the column processing unit 50, and the offset component generated by passing through the column processing unit 50 is corrected by using the stored correction value to remove the vertical smear noise component caused by the offset component.

In order to supply the reference signal for the pixel signal to the vertical signal line 31, for example, it is preferable that, when part of the pixel array unit 30 is shielded, a pixel signal of the unit pixel in the shielded state is read to the vertical signal line 31 as a reference signal. As the unit pixel in the shielded state, a pixel in an optical black pixel area provided in the shielded state at a periphery of the pixel array unit 30 (periphery of an active pixel region) can be generally used.

In the column processing unit 50, the AD conversion and the digital CDS processing are performed by setting the read gain (gain of the variable gain amplifier 521) of the pixel signal in the optical black pixel area at an arbitrary magnification n-times, and setting another gain at m-times, then, information of the gain×n and the gain×m are stored in the memory as the correction value for correcting the gain error between the P phase and the D phase.

The acquisition of the correction value is performed when respective pixels of the pixel array unit 30 including the optical black pixel area are selectively scanned by the vertical driving unit 40. In the case of a solid-state imaging device which performs driving of generating a dummy signal by each one field for time adjustment, it can be considered that the correction value is outputted when the dummy signal is outputted by using that period of time.

As a method for acquiring the correction value for the gain error between the P phase and the D phase, the following method can be cited.

[Method 1]

The acquisition is performed by using the pixel signal in the optical black pixel area in the same conditions as pixels in the active pixel area as usual except the gain setting. In this method, reading can be performed in the same environment as the normal reading, therefore, it is considered that the mismatch between the pixel signal in the optical black pixel area and the pixel signal of the active pixel area by the comparator 522 seldom occurs.

[Method 2]

When the pixel signal in the optical black pixel area is read in the method 1, the gain error between the P phase and the D phase is outputted in a state in which the transfer transistor 22, the reset transistor 23 and the selection transistor 25 of the unit pixel 20 are fixed in the on-state, thereby eliminating effects due to variations according to pixels or dark current which are generated by the unit pixel 20.

In this case, it is not necessary that the transfer transistor 22 is turned on, however, there is a possibility that dark current generated by internal defects of the photodiode 21 is accumulated in the photodiode 21, which may affect the output signal in some cases, therefore, there is an advantage of eliminating dark current when the transfer transistor 22 is turned on.

[Method 3]

Pixel signals are obtained from pixels of plural rows in the optical black pixel area with respect to the particular gain setting by using the methods 1, 2, and these signals are averaged to obtain the correction value. When using the method 3, effect of dark current appeared as the error peculiar to the pixels, characteristic variations of the amplification transistor 24 and black points due to contact failure can be reduced.

[Method 4]

A switching circuit giving a fixed voltage to the vertical signal line 31 is separately connected, and the correction value for the gain error between the P phase and the D phase is obtained based on the fixed voltage given from the switching circuit. As the fixed voltage, a voltage corresponding to the pixel signal level in the optical black pixel area, namely, a voltage to be the reference of the pixel signal level of the active pixel area may be given.

When using the method 4, the number of transistors necessary to obtain the correction value is only one, whereas four transistors are necessary including the amplification transistor 24 in the method 2, which allows the switch to be large. Additionally, since the configuration is simple, it is possible to reduce variations and a failure rate, which improves accuracy of the correction value and enhances yield.

The memory holding correction values obtained as described above is provided at an arbitrary circuit portion of the counter/latch circuit unit 53, the multiplexer 81 or the DSP circuit 82 in FIG. 1. As the memory, a 1H (H means a horizontal period) line memory is used. 1H line memories corresponding to the number of gains to be switched in the variable gain amplifier 521 are provided. Therefore, in the case that the gain is switched in two patterns, two 1H line memories are necessary, that is, in the case that the gain is switched in N-patterns, N-pieces of 1H line memories are necessary.

(Specific Embodiments)

Hereinafter, specific embodiments for eliminating the vertical smear noise component caused by the gain error generated by the mismatch between the P phase and the D phase will be explained.

In the following respective embodiments to be explained, gain switching in the variable gain amplifier 522 includes switching of ×1 and ×8 as an example. The P phase is fixed to gain×8. The reason is that, when the P phase is gain×8 and is adjusted to the D phase in the low luminance state which requires the same accuracy (gain setting of the gain detector 523 is ×8 because of low luminance), the mismatch between the P phase and the D phase will become as small as possible, and trouble of adding a circuit for setting the P phase at gain×1 will be saved.

(Embodiment 1)

Figure 7:
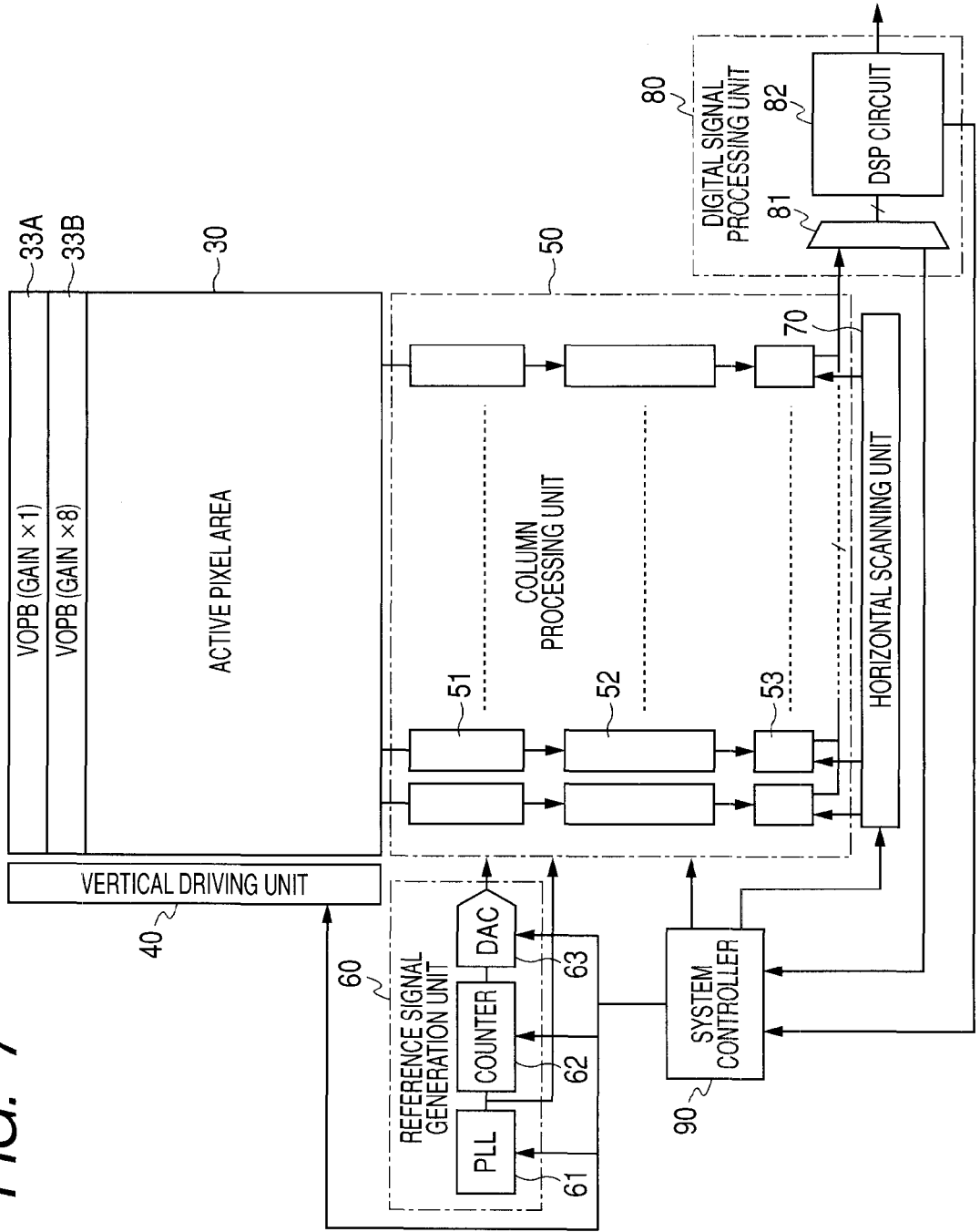
FIG. 7 is a block diagram showing an outline of a configuration of a CMOS solid-state imaging device according to Embodiment 1.

FIG. 7 is a block diagram showing an outline in a configuration of a CMOS solid-state imaging device 10 according to Embodiment 1. In the drawing, the same components as FIG. 1 are shown by putting the same codes.

In Embodiment 1, a pixel row 33A of an optical black pixel area (VOPB), for example, at the upper side in the pixel array unit 30 is used as a correction pixel row for obtaining a correction value of gain×1, a pixel row 33B is used as a correction pixel row for obtaining a correction value of gain×8 respectively, and pixel signals obtained from respective pixels of the correction pixel rows 33A, 33B are made to be passed through the column processing unit 50, thereby obtaining correction values of gain×1 and correction values of gain×8 for correcting gain errors between the P phase and the D phase, as well as correction processing for the gain errors is performed in row units by using these correction values in, for example, the multiplexer 81.

Respective pixel signals of the pixel rows 33A, 33B can be obtained from pixels of one row respectively, however, as described in the method 3 above, pixel signals are obtained from pixels of plural rows and averaged to get a correction value, thereby reducing effects of dark current, characteristic variations of the amplification transistor 24 and black points due to contact failure.

[Multiplexer]

Figure 8:
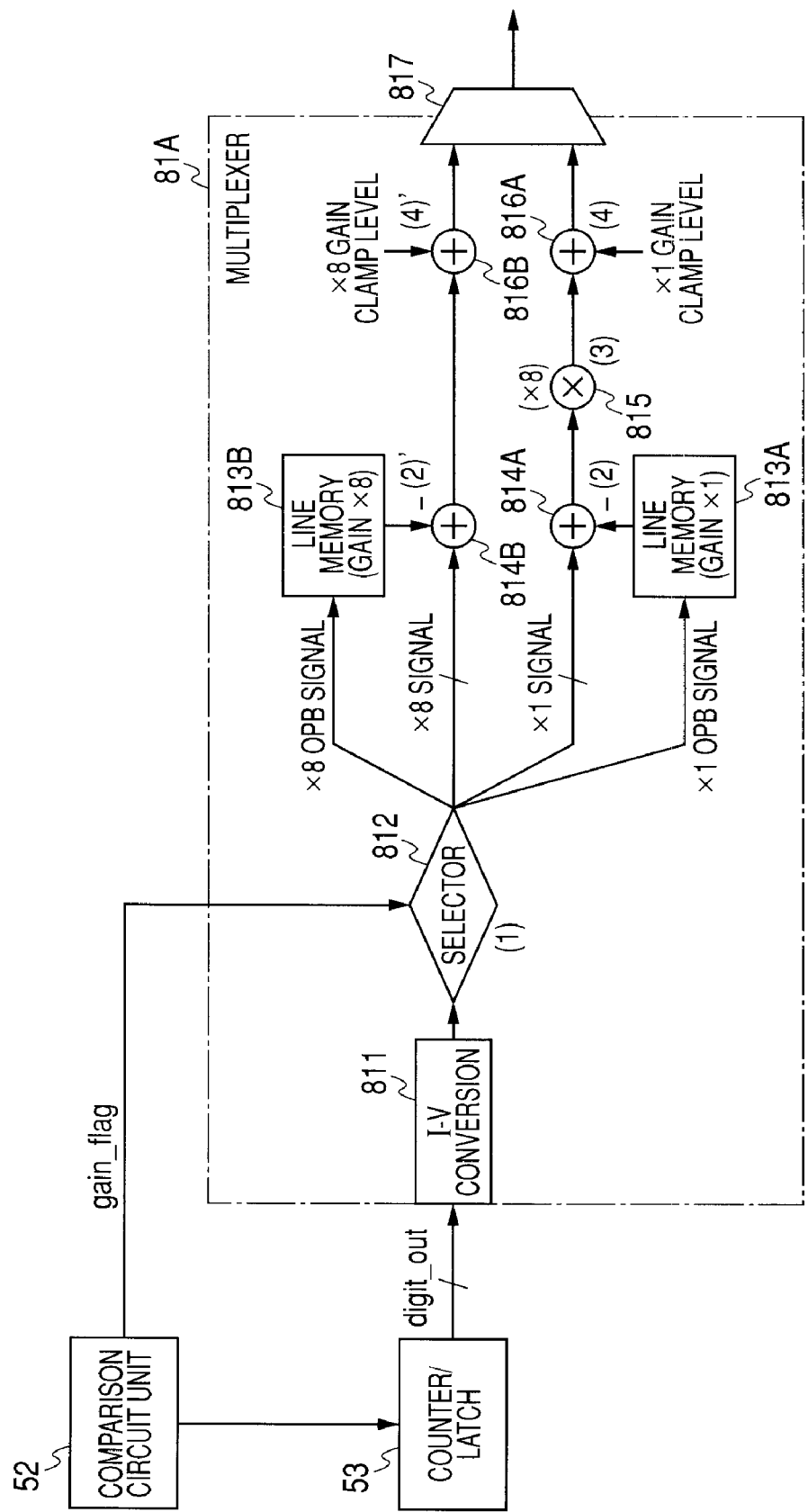
FIG. 8 is a block diagram showing an example of a specific configuration of a multiplexer according to Embodiment 1.

FIG. 8 is a block diagram showing an example of a specific configuration of a multiplexer 81A according to Embodiment 1. As shown in FIG. 8, the multiplexer 81A according to the embodiment includes a current/voltage conversion circuit 811, a selector 812, two line memories 813A, 813B corresponding to the number of switching gains of the variable gain amplifier 521, two adders 814A, 814B, a digital amplifier 815, two clamp circuits 816A, 816B and an output circuit 817.

Gains of pixel signals obtained from respective pixels of the pixel rows 33A, 33B of the optical black pixel area (VOPB) are multiplied by 1 and 8 by the variable gain amplifier 521 in the comparison circuit unit 52, and the digital CDS processing is performed to the pixel signals in the counter/latch circuit unit 53, then, the signals are inputted to the multiplexer 81A as digital signals in the form of current.

In the multiplexer 81A, the selector 812 outputs pixel data inputted from the counter/latch circuit 53, dividing the data into four systems of respective pixel data of gain×1 and gain×8 obtained from respective pixels of the pixel rows 33A, 33B, and respective pixel data of gain×1 and gain×8 obtained from respective pixels in the active pixel area, based on a gain setting signal (flag) gain_flag supplied from the gain flag holding circuit 527 in the comparison circuit unit 52, synchronized with the horizontal scanning by the horizontal scanning unit 70.

When imaging is performed in a black screen, offset components generated by reasons other than the comparator 522 of the comparison circuit unit 52 are generated, which will be appeared as vertical smear noise. On the other hand, when imaging is performed in a white screen, components caused by the gain difference between the P phase and the D phase are also superimposed in addition to the offset components generated by reasons other than the comparator 522, therefore, vertical smears appear as different forms from the gain× 8.

The digital data obtained from respective pixels of the pixel rows 33A, 33B and inputted through the column processing unit 50 corresponds to the offset components, which is converted from current into voltage in the current/voltage conversion circuit 811, then, held in the line memories 813A, 813B by the dividing by the selector 812 as correction values, respectively.

Though not shown here, when the correction value is calculated by averaging pixel signals of plural rows, averaging circuits for calculating average values of pixel signals of plural rows at respective input sides of the line memories 813A, 813B.

FIG. 9 is a conceptual diagram of showing the processing of respective units of the multiplexer 81A. FIG. 8 shows a configuration of a multiplexer. Specifically, in FIG. 8, (1) denotes processing of the selector 812, (2), (2)' denote respective processing of the adders 814A, 814B, (3) denotes processing of the digital amplifier 815 and (4), (4)' denote respective processing of the clamp circuits 816A, 816B.

The adder 814A performs addition (actually, subtraction) of a correction value of the same column stored in the line memory 813A with respect to the pixel data (an offset component caused by passing through the column processing unit 50) when pixel data of gain×1 obtained from respective pixels of the active pixel area by the dividing of the selector 812 is inputted, thereby removing vertical smear noise component caused by the gain error generated by the mismatch between the P phase and the D phase.

Similarly, the adder 814B performs addition (actually, subtraction) of a correction value of the same column stored in the line memory 813B with respect to the pixel data (an offset component caused by passing through the column processing unit 50) when pixel data of gain×8 obtained from respective pixels of the active pixel area by the dividing of the selector 812 is inputted, thereby removing vertical noise component caused by the gain error generated by the mismatch between the P phase and the D phase.

The digital amplifier 815 multiplies pixel data of gain×1 by 8, which is outputted from the adder 814A after noise reduction, thereby adjusting the level to pixel data of gain×8 outputted from the adder 814B after noise removal.

The clamp circuits 816A, 816B add clamp levels to the pixel data of gain×1 and gain×8 after noise removal, outputting the data to the DSP circuit 82 of the next stage through the composite circuit 817.

As described above, for example, the pixel row 33A of the optical black pixel area (VOPB) at the upper side in the pixel array unit 30 is used as a correction pixel row of gain×1, the pixel row 33B is used as a correction pixel row of gain×8 respectively, and pixel signals obtained from respective pixels of the correction pixel rows 33A, 33B are made to be passed through the column processing unit 50, thereby obtaining the correction value of gain×1 and the correction value of gain×8 for correcting the gain error between the P phase and the D phase, as well as correction processing for the gain error is performed in row units by using these correction values in, for example, the multiplexer 81, as a result, the vertical smear noise component caused by the gain errors between the P phase and the D phase can be removed to improve image quality.

Figure 10:
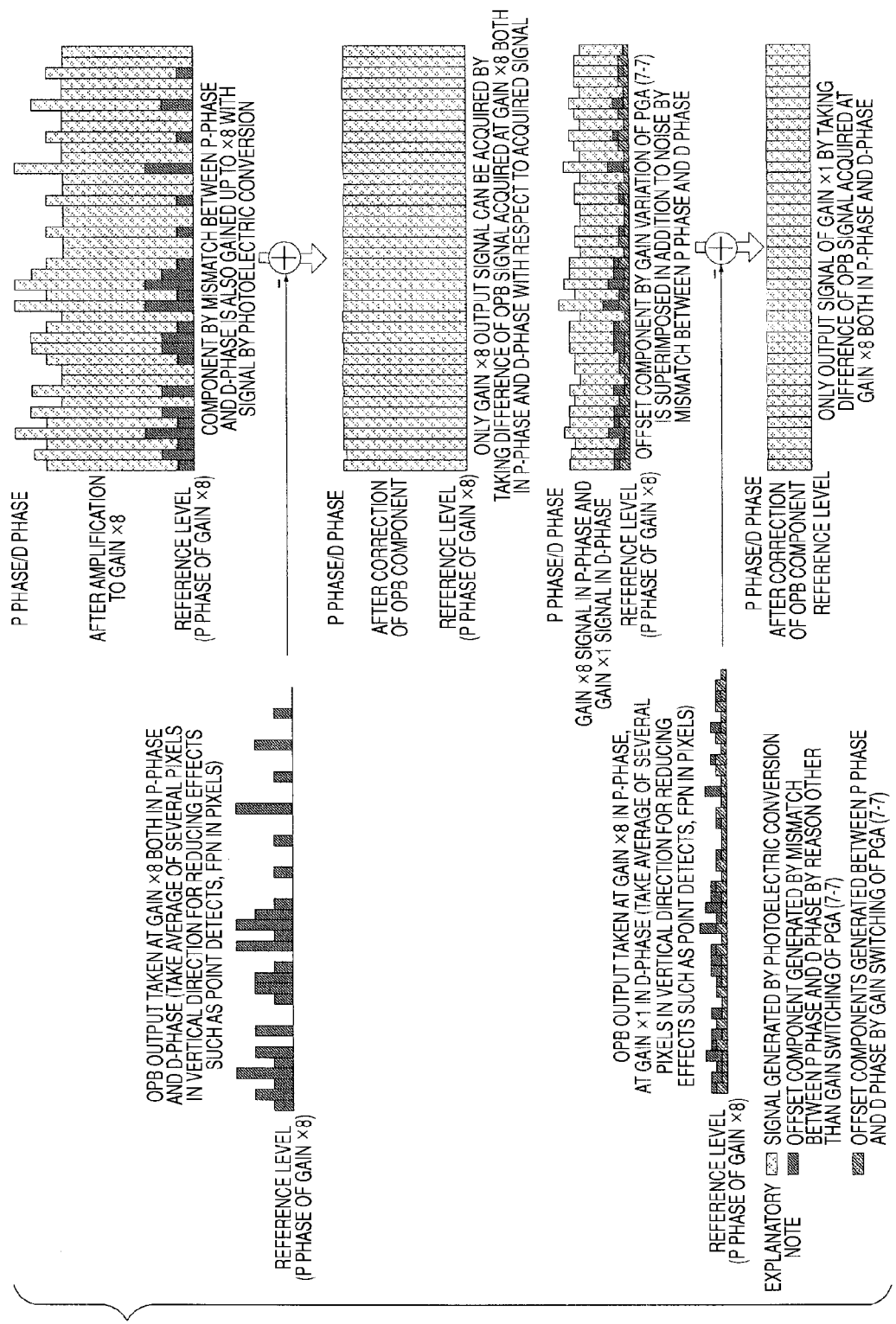
FIG. 10 is a level diagram showing the state of removal of a vertical smear noise component caused by the gain error between the P phase and the D phase according to Embodiment 1.

FIG. 10 shows the state of removal of the vertical smear noise component caused by the gain error between the P phase and the D phase according to Embodiment 1. In FIG. 10, OPB output denotes the pixel signal in the optical black pixel area (OPB).

The correction value for correcting the gain error between the P phase and the D phase is obtained by using the pixel signal in the optical black pixel area, thereby correcting vertical smears without adding additional circuits in the solid-state imaging device, and thereby correcting vertical smears without spending additional time in the active pixel area.

Particularly, since the correction processing of the gain error is performed in the multiplexer 81, S/N of pixels can be largely improved without burdening the DSP circuit 82 which has many tasks, and without adding a large-scale circuit to be a large obstacle in actual design in the column processing unit 50.

Even when the number of gain switching in the variable gain amplifier 522 in the comparison circuit unit 52 is equal to or more than 3, correction processing for the gain error can be appropriately performed by increasing the line memory so as to correspond to the number of gain switching, as a result, the vertical smear noise component can be positively removed.

MODIFICATION EXAMPLE 1

In the above Embodiment 1, which of gain×1 or gain×8 is applied is judged in row units and the correction processing for the gain error is performed in row units, however, it is possible which of gain×1 or gain×1 is applied is judged in pixel units and the correction processing for the gain error is performed in pixel units.

Figure 11:
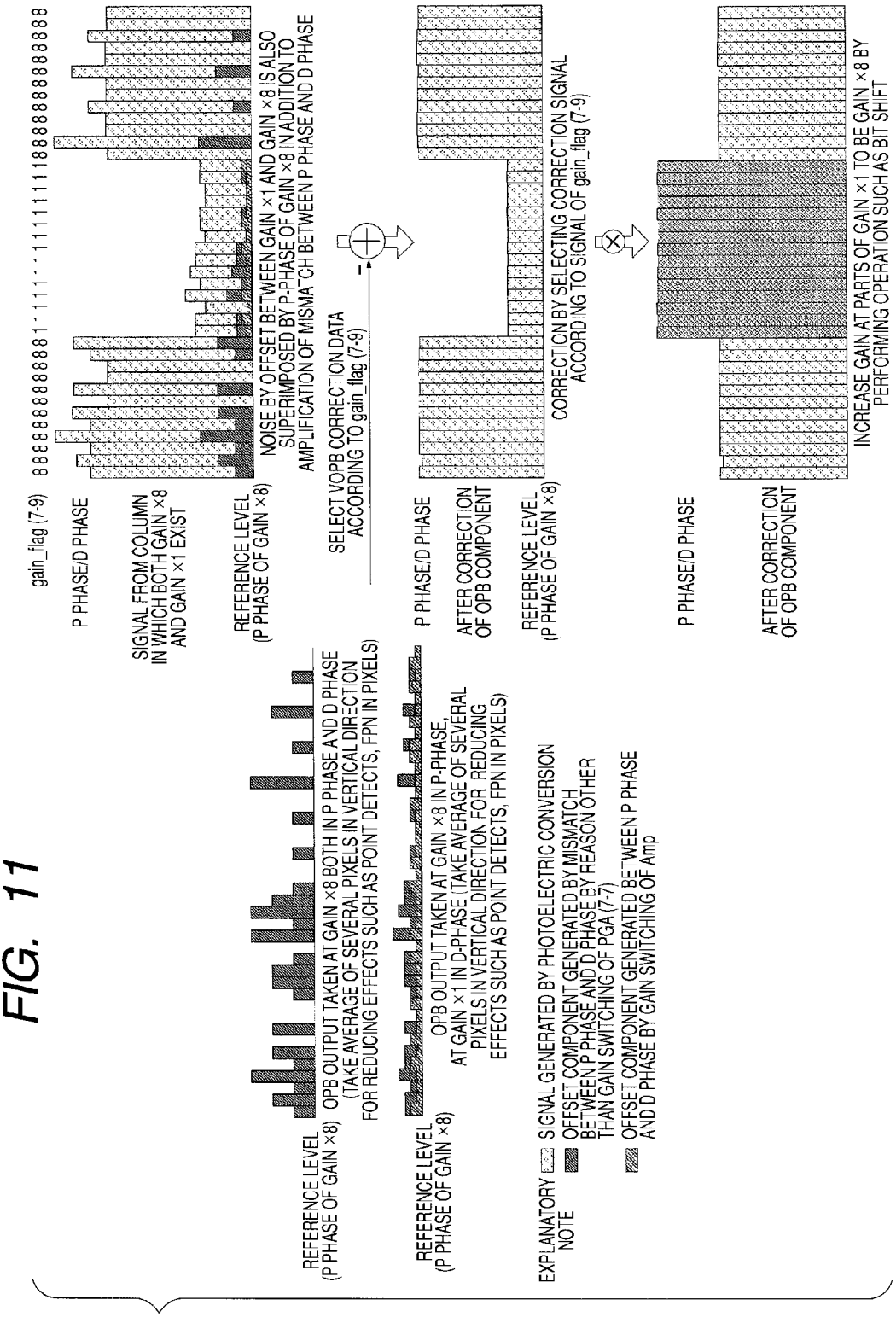
FIG. 11 is a level diagram showing state of removal of the vertical smear noise component caused by the gain error between the P phase and the D phase according to Modification example 1 of Embodiment 1.

In the case that the correction processing of the gain error is performed in pixel units, the correction processing of the gain error can be performed according to pixels even when plural gains are set on the same line by each pixel, therefore, appropriate gain correction can be realized. FIG. 11 shows the state of removal of the vertical smear noise component caused by the gain error between the P phase and the D phase according to Modification example 1.

MODIFICATION EXAMPLE 2

Figure 12:
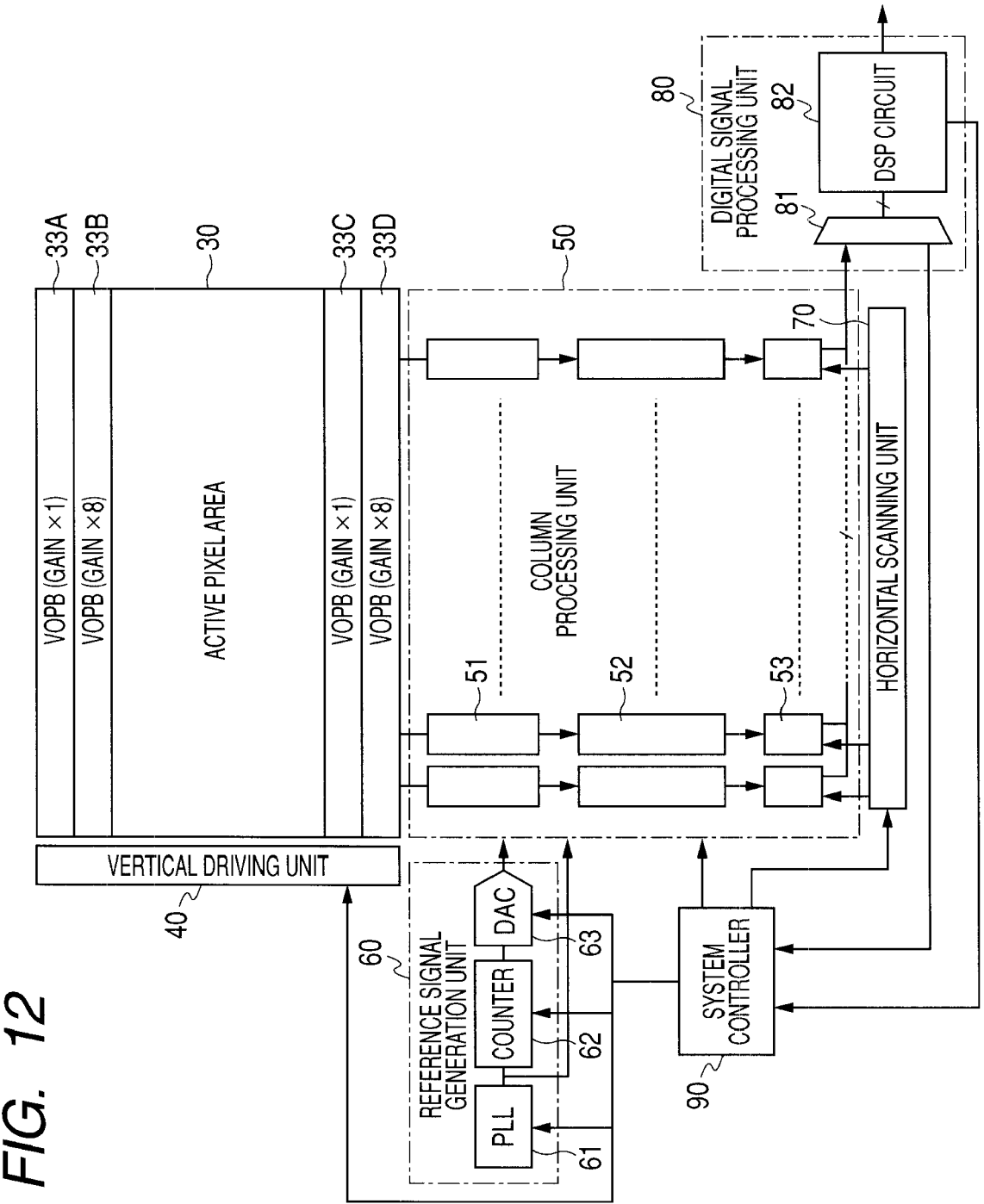
FIG. 12 is a block diagram showing an outline of a configuration of a CMOS solid-state imaging device according to Modification example 2 of Embodiment 1.

In the above Embodiment 1, the pixel row 33A of an optical black pixel area at the upper side in the pixel array unit 30 is used as a pixel row for obtaining the correction value of gain×1, the pixel row 33B is used as a pixel row for obtaining the correction value of gain×8 respectively, and it is also possible, as shown in FIG. 12, that a pixel row 33C for obtaining the correction value of gain×1 and a pixel row 33D for obtaining the correction value of gain×8 are provided at the optical black pixel area at the lower side of the pixel array unit 30.

In this case, when setting the correction value, it can be considered that average values of respective pixel signals of the pixel rows 33A, 33B at the upper side of the pixel array unit 30 and respective pixel signals of pixel rows 33C, 33D at the lower side are calculated to obtain correction values, or average values are calculated by weighting respective pixel signals of the pixel rows 33A, 33B at the upper side and the respective pixel signals of pixel rows 33C, 33D at the lower side to obtain a correction value.

As described above, positions of the correction pixel rows for obtaining correction values used for the correction processing of the gain error are separated by setting the correction pixel rows in the optical black pixel area at the upper side of and in the optical black pixel area at the lower side of the pixel array unit 30, and the correction processing for gain errors is performed by obtaining correction values using pixel signals of respective pixels of correction pixel rows which are apart from each other, thereby further improving image quality because effects of variations in the vertical direction (shading) can be reduced as compared with the case in which correction pixel rows are set only at one side in the optical black pixel area.

(Embodiment 2)

Figure 13:
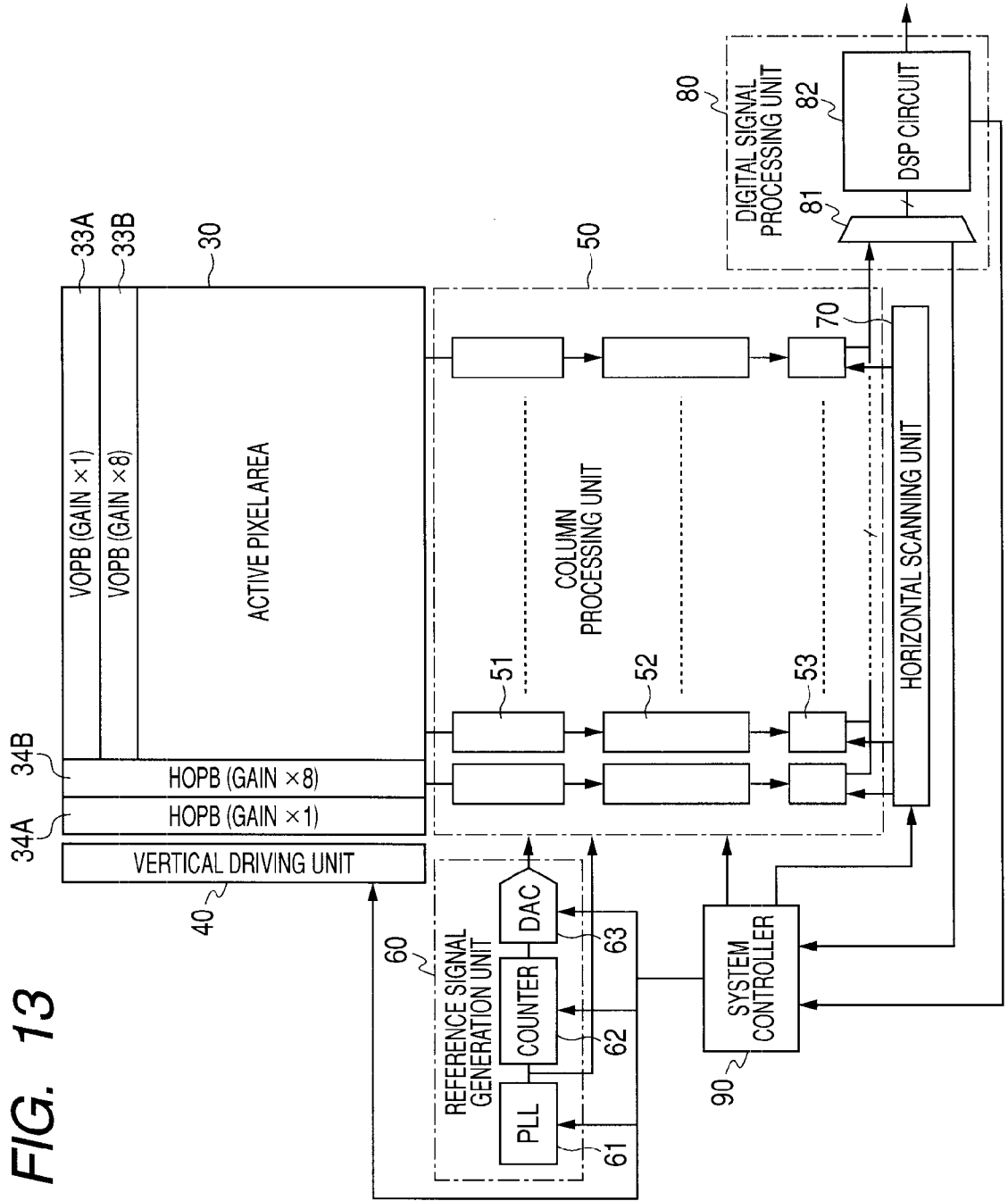
FIG. 13 is a block diagram showing an outline of a configuration of a CMOS solid-state imaging device according to Embodiment 2.

FIG. 13 is a block diagram showing an outline of a configuration of a CMOS solid-state imaging device 10 according to Embodiment 2. In the drawing, the same components as FIG. 1 are shown by putting the same codes.

In Embodiment 2, in addition that the pixel row 33A of the optical black pixel area (VOPB) at the upper side in the pixel array unit 30 is used as a pixel row for obtaining the correction value of gain×1 and the pixel row 33B is used as a pixel row for obtaining the correction value of gain×8 respectively, a pixel column 34A of an optical black pixel area (HOPB) at the left side of the pixel array unit 30 is used as a pixel column for obtaining the correction value of gain×1, a pixel column 34B is used as a pixel column for obtaining the correction value of gain×8, and pixel signals obtained from respective pixels of the correction pixel rows 33A, 33B and the pixel columns 34A, 34B are made to be passed through the column processing unit 50, thereby obtaining the correction value of gain×1 and the correction value of gain×8 for the correcting gain error between the P phase and the D phase, as well as correction processing for the gain error is performed by using these correction values in, for example, the multiplexer 81.

In this case, one field period before imaging is allowed to be a correction value obtaining period, gains are set commonly in the P phase, and individually in the D phase with respect to the pixel rows 33A, 33B of the optical black pixel area at the upper side and the pixel columns 34A, 34B of the optical black pixel area at the left side, and correction values are obtained to be held in the multiplexer 81 to perform the correction processing of the gain error.

It is also possible that respective pixel signals of the pixel columns 34A, 34B are obtained from pixels of one column respectively, however, pixel signals are obtained from pixels of plural columns and these signals are averaged to obtain a correction value, thereby reducing effects of dark current, characteristic variations of the amplification transistor 24 and black points due to contact failure.

[Multiplexer]

Figure 14:
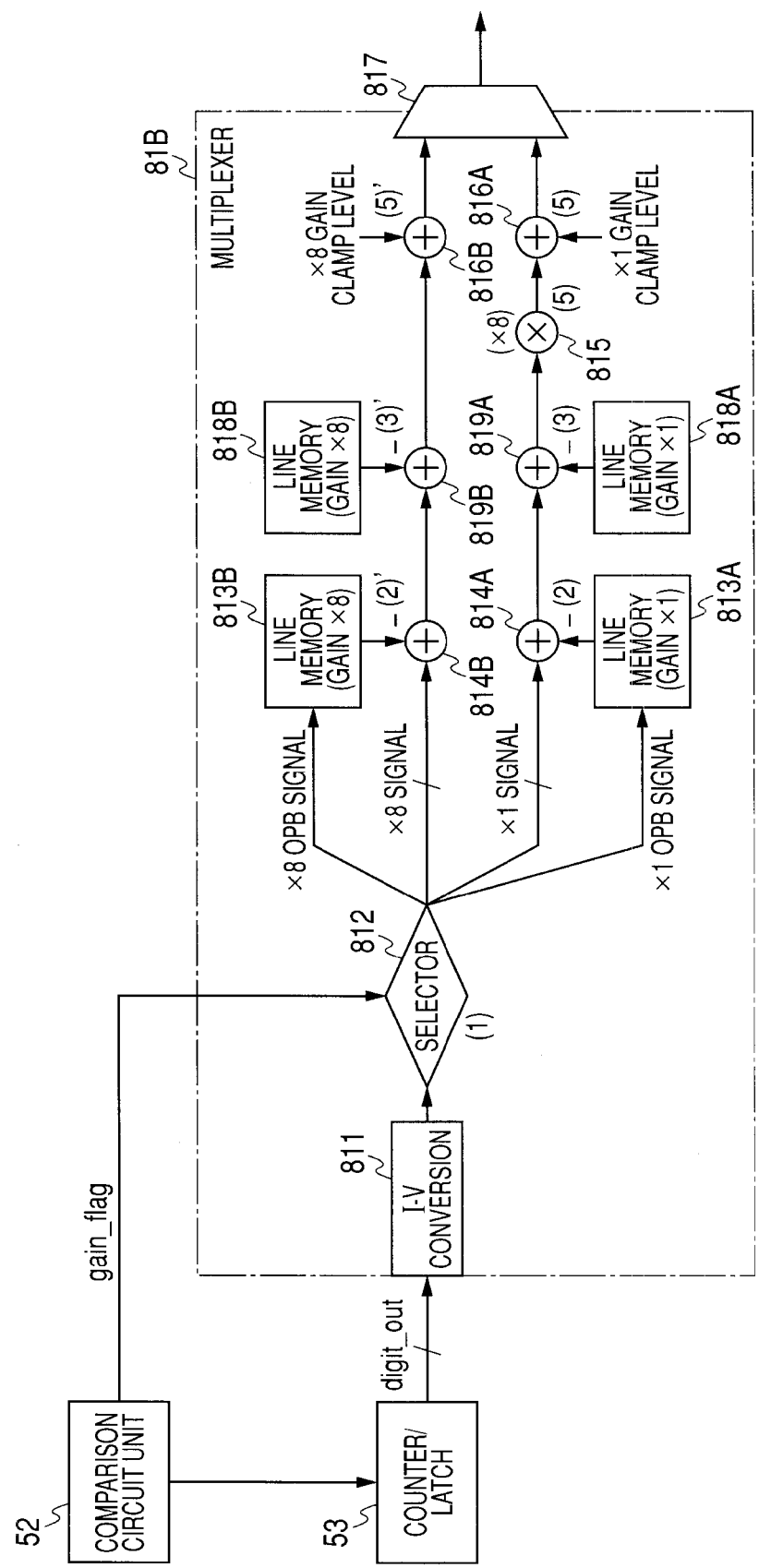
FIG. 14 is a block diagram showing a specific example of a multiplexer according to Embodiment 2.

FIG. 14 is a block diagram showing an example of a specific configuration of a multiplexer 81B according to Embodiment 2. In the drawing, the same components as FIG. 8 are shown by putting the same codes.

As shown in FIG. 14, the multiplexer 81B according to the embodiment includes, in addition to the components of the multiplexer 81A according to Embodiment 1, that are, the current voltage conversion circuit 811, the selector 812, the two line memories 813A, 813B, the adders 814A, 814B, the digital amplifier 815, the two clamp circuits 816A, 816B and the output circuit 817, two line memories 818A, 818B and two adders 819A, 819B corresponding to the number of switching gains of the variable gain amplifier 521.

In the multiplexer 81B, digital data obtained from respective pixels of the pixel rows 33A, 33B and inputted via the column processing unit 50 is held in the line memories 813A, 813B as correction values, whereas, digital data obtained from respective pixels of the pixel columns 34A, 34B and inputted via the column processing unit 50 is held in the line memories 818A, 818B as correction values.

Though not shown in the drawing, when the correction values are calculated by averaging respective pixel signals of plural rows and plural columns, averaging circuits calculating average values of pixel signals of plural rows are provided at respective input sides of line memories 813A, 813B and averaging circuits calculating average values of pixel signals of plural columns are provided at respective input sides of the line memories 818A, 818B, respectively.

Figure 15:
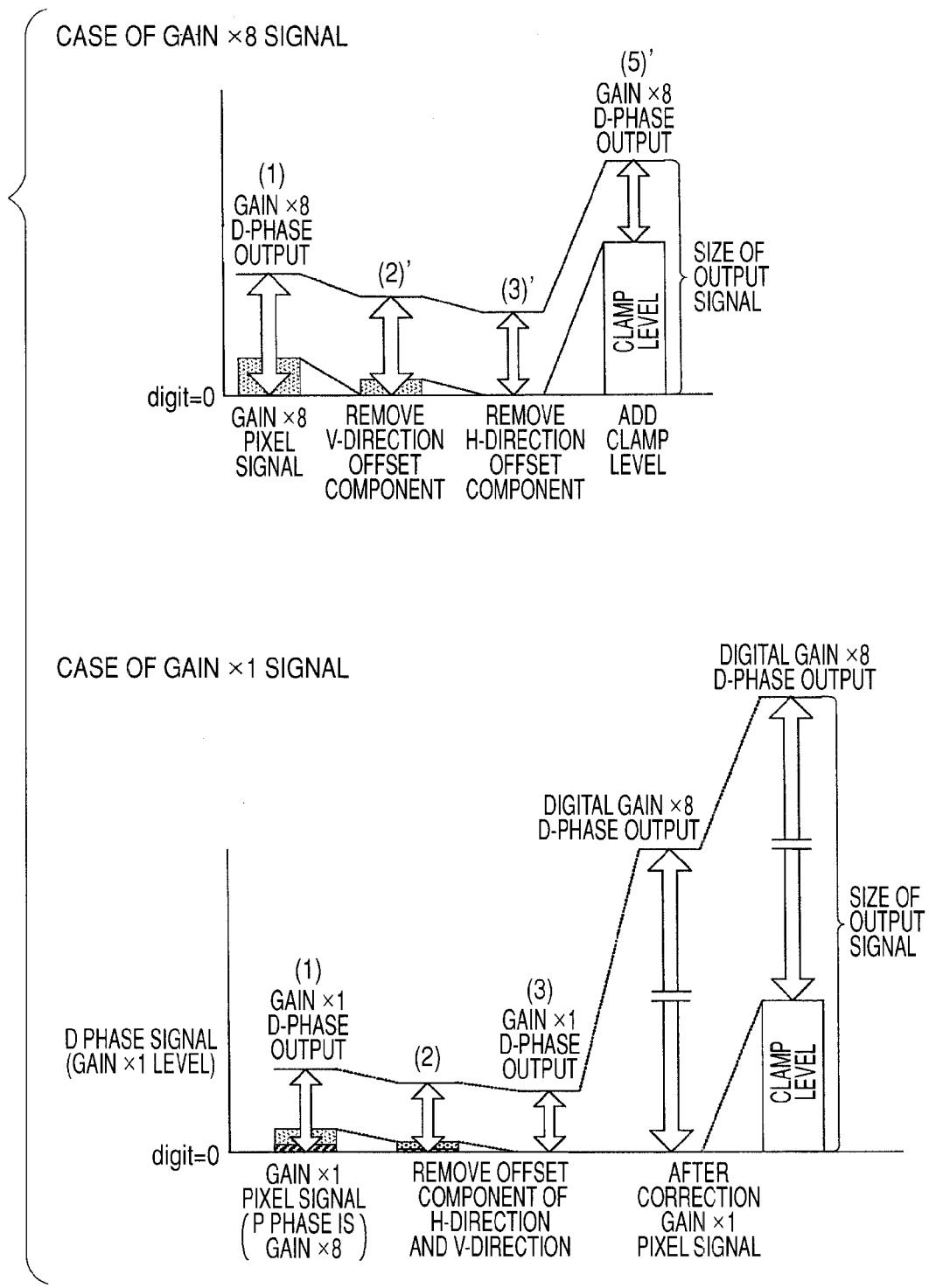
FIG. 15 is a level diagram showing the state of removal of the vertical smear noise component caused by the gain error between the P phase and the D phase according to Embodiment 2.

FIG. 15 is a conceptual diagram of processing of respective units in the multiplexer 81B. In FIG. 15, (1) denotes processing of the selector 812, (2), (2)' denote respective processing of the adders 814A, 814B, (3) (3)' denote respective processing of the adders 819A, 819B, (4) denotes processing of the digital amplifier 815 and (5), (5)' denote respective processing of the clamp circuits 816A, 816B.

As described above, after processing of performing addition (actually, subtraction) of a correction value corresponding to an offset component in the vertical direction held in the line memories 813A, 813B is performed with respect to respective pixel data of the active pixel area of the pixel array unit 30, processing of performing addition (actually, subtraction) of a correction value corresponding to an offset component in the horizontal direction held in the line memories 818A, 818B is performed, thereby removing horizontal smear noise component (line detects in the horizontal direction) in addition to the vertical noise component, as a result, image quality can be further improved.

MODIFICATION EXAMPLE 3

Figure 16:
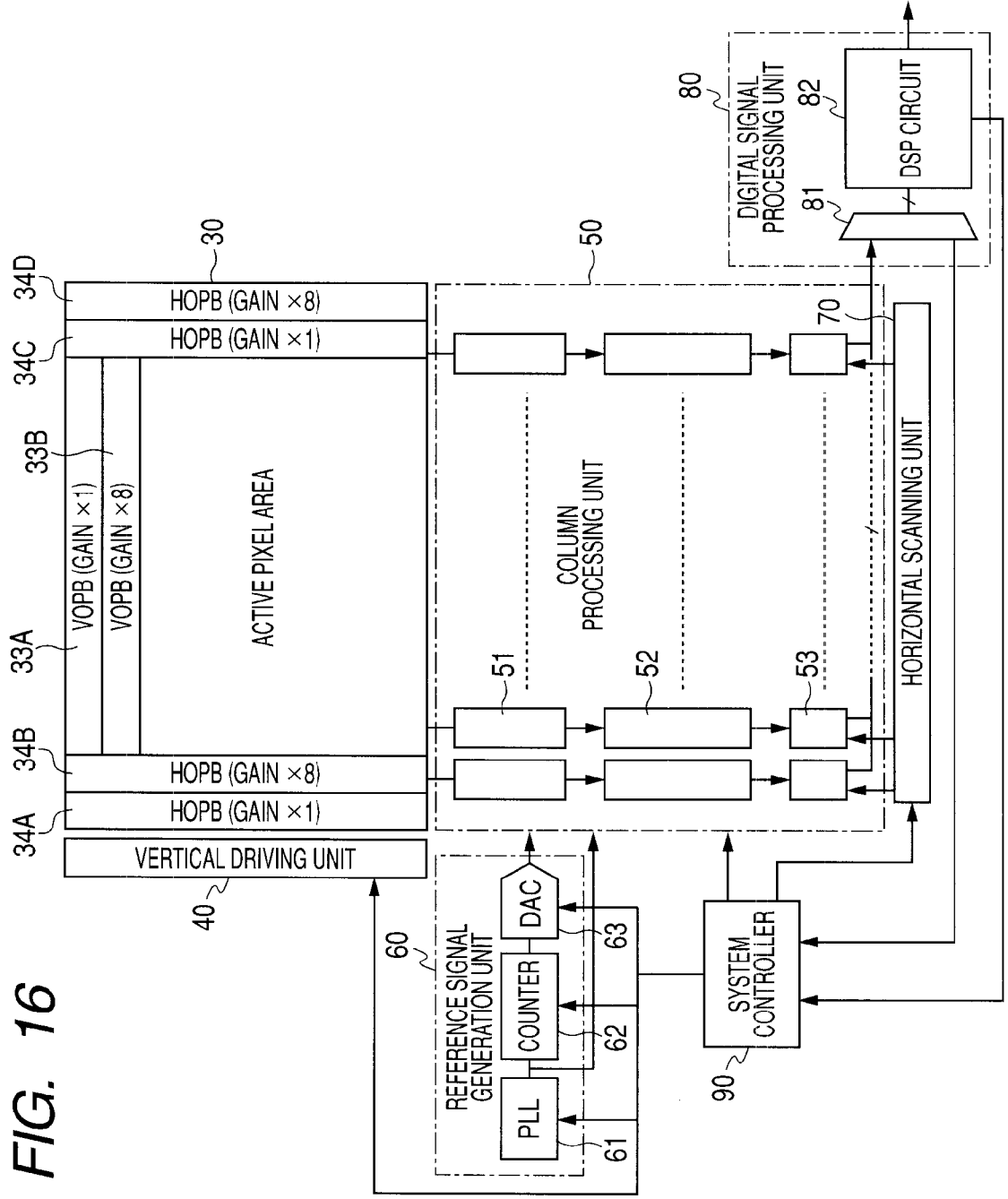
FIG. 16 is a block diagram showing an outline of a configuration of a CMOS solid-state imaging device according to Modification example of Embodiment 2.

In the above Embodiment 2, the pixel column 34A of the optical black pixel area at the left side of the pixel array unit 30 is used as a pixel column for obtaining the correction value of gain×1, the pixel column 34B is used as a pixel row for obtaining the correction value of gain×8 respectively, and it is also possible, as shown in FIG. 16, that a pixel column 34C for obtaining the correction value of gain×1 and a pixel column 34D for obtaining the correction value of gain×8 are provided at the optical black pixel area at the right side of the pixel array unit 30.

In this case, when setting the correction value, it can be considered that average values of respective pixel signals of the pixel columns 34A, 34B at the left side of the pixel array unit 30 and respective pixel signals of pixel columns 34C, 34D at the right side are calculated to obtain correction values, or average value are calculated by weighting respective pixel signals of the pixel columns 34A, 34B at the left side and the respective pixel signals of pixel columns 34C, 34D at the right side to obtain correction values.

As described above, positions of the correction pixel columns for obtaining correction values used for the correction processing of gain errors are separated by setting the correction pixel columns in the optical black pixel area at the left side and in the optical black pixel area at the right side of the pixel array unit 30, and the correction processing for gain errors is performed by obtaining correction values using pixel signals of respective pixels of correction pixels columns which are apart from each other, thereby further improving image quality because effects of variations in the vertical direction (shading) can be reduced as compared with the case in which correction pixel rows are set only at one side in the optical black pixel area.

The solid-state imaging device of FIG. 16 is combined with the solid-state imaging device shown in FIG. 13, that is, the solid-state imaging device having a configuration in which the pixel row 33A for obtaining correction values of gain×1 and the pixel row 33B for obtaining correction values of gain×8 are provided in the optical black pixel area at the upper side of the pixel array 30, and it is also possible that the solid-state imaging device is combined with the solid-state imaging device shown in FIG. 12, that is, the solid-state imaging device having the configuration in which pixel row 33C for obtaining correction values of gain×1 and the pixel row 33D for obtaining correction values of gain×8 are provided in the optical black pixel area at the lower side of the pixel array unit 30.

Figure 17:
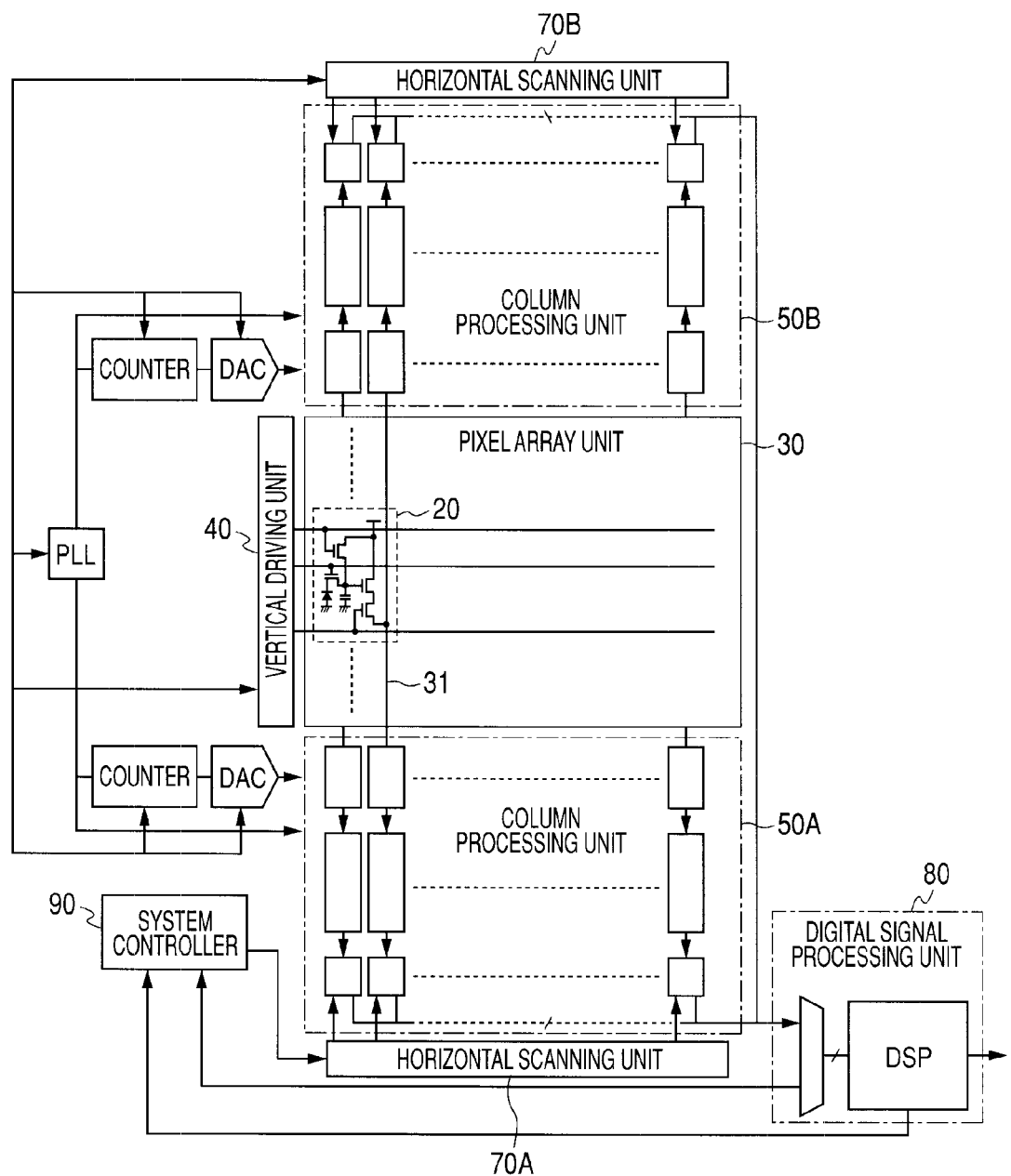
FIG. 17 is a block diagram showing an outline of another configuration of an amplification type solid-state imaging device.

In the above embodiments, the case in which the invention is applied to the amplification type solid-state imaging device having a configuration in which the column processing unit 50 is arranged at one side in the up-and-down direction (vertical direction) of the pixel array unit 30 has been explained as an example, however, the invention is not limited to the application, and the invention can be applied to an amplification type solid-state imaging device having a configuration, as shown in FIG. 17, in which column processing units 50A, 50B are arranged at both up-and-down sides of the pixel array unit 30 for speeding up the signal processing, in which pixel signals of odd-number rows of the pixel array unit 30 are read and processed in the column processing unit 50A at the lower side, and even-number rows of the pixel array unit 30 are read and processed in the column processing unit 50B at the upper side, after that, signals are digitally processed at the common digital signal processing unit 80.

In the above embodiments, the COMS solid-state imaging device in which unit pixels detecting signal charges according to the visible light amount as physical quantity are arranged in a matrix state has been explained as an example, however, the invention is not limited to the application to the CMOS solid-state imaging device, and can be applied to all column type solid-state imaging devices in which column processing units are arranged at respective pixel columns in the pixel array unit.

In addition, the invention is not limited to the application to the solid-state imaging device which detects and images distributions of incident light amount of visible light as images, but can be applied to solid-state imaging devices which images distributions of incident light amount such as infrared radiation, X-ray or particles as images, or, in the broad sense, all solid-state imaging devices (physical quantity distribution detectors) such as a fingerprint detection sensor, which detects and images distributions of other physical quantity such as pressure or capacitance as images.

Furthermore, the invention is not limited to the solid-state imaging device which sequentially scans respective unit pixels in the pixel array unit in row units and reads pixel signals from respective unit pixels, but can be also applied to an X-Y address type solid-state imaging device which selects arbitrary pixels in pixel units and read signals from the selected pixels in pixel units.

It is preferable that the solid-state imaging device is formed in on-chip, or that it is a module-state device having an imaging function, in which the imaging unit and the signal processing unit or the optical system are integrally packaged.

The invention is not limited to the application to the solid-state imaging device, but can be applied to an imaging apparatus. Here, the imaging apparatus indicates camera systems such as a digital still camera or a video camera, and electronic devices having an imaging function such as a cellular phone. The module-state device mounted on an electronic device, that is, a camera module can be dealt with as an imaging apparatus.

[Imaging Apparatus]

Figure 18:
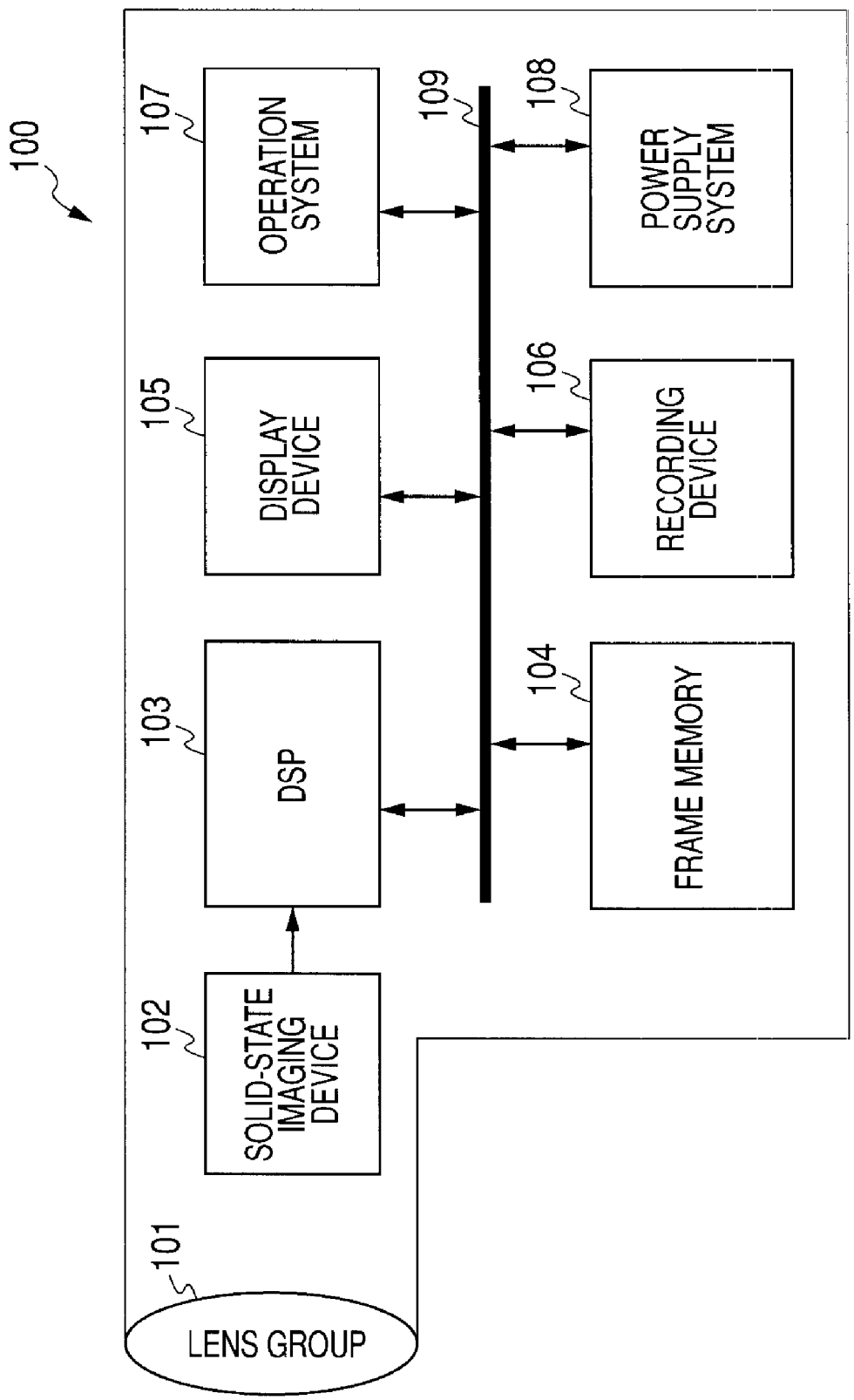
FIG. 18 is a block diagram showing an example of a configuration of an imaging apparatus according to an embodiment of the invention.

FIG. 18 is a block diagram showing an example of a configuration of an imaging apparatus according to an embodiment of the invention. As shown in FIG. 18, an imaging apparatus 100 according to an embodiment of the invention includes an optical system including a lens group 101, a solid-state imaging device 102, a DSP circuit 103 as a camera signal processing circuit, a frame memory 104, a display device 105, a recording device 106, an operation system 107, a power supply system 108 and the like, in which the DSP circuit 103, the frame memory 104, the display device 105, the recording device 106, the operation system 107 and the power supply system 108 are mutually connected through a bus line 109.

The lens group 101 takes incident light from a subject (image light) and focuses it on an imaging surface of the solid-state imaging device 102. The solid-state imaging device 102 converts the light amount of incident light focused on the imaging surface by the lens group 101 into electric signals in pixel units and outputs them as pixel signals. As the solid-state imaging device 102, the amplification type solid-state imaging device 10 according to the embodiment is used.

However, portions excluding the digital signal processing unit 80 in the amplification type solid-state imaging device 10 shown in FIG. 1 are used as the solid-state imaging device 102. The DSP circuit 103 corresponds to the digital signal processing unit 80 shown in FIG. 1.

The display device 105 is configured to have a panel-type display device such as a liquid crystal display device or an organic EL (electro Luminescence) display device, which displays moving pictures or still pictures imaged by the solid-state imaging devices. The recording unit 106 records moving pictures or still pictures imaged by the solid-state imaging device 102 in recording media such as a video tape or a DVD (Digital Versatile Disk).

The operation system 107 gives operation instructions with respect to various functions included in the imaging apparatus under operations by the user. The power supply system 108 appropriately supplies various power supplies to be operation power supplies for the DSP circuit 103, the frame memory 104, the display device 105, the recording device 106 and the operation system 107 to the objects receiving supplies.

As described above, the CMOS solid-state imaging device 10 according to the embodiment is used as the solid-state imaging device 102 in the imaging apparatuses such as the video camera, the digital still camera and camera modules for mobile devices like the cellular phone, thereby removing the vertical smear noise component caused by the gain error between the P phase and the D phase in the CMOS solid-state imaging device 10, as a result, an advantage of improving image quality of imaged pictures can be obtained.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state imaging device, comprising:
a pixel array unit in which unit pixels including photoelectric conversion elements are arranged in a matrix, the pixel array unit configured to (1) generate a first signal at the time of reset of a unit pixel and a second signal corresponding to electric charges obtained by the photoelectric conversion in the photoelectric conversion element of the pixel unit and (2) output the first and second signals to a signal line as a pixel signal;
a signal supply unit configured to supply a reference signal to the signal line;
a signal processing unit including (1) a variable gain amplifier configured to amplify various signals including the reference signal and the pixel signal at a plurality of gains, each gain set in accordance with the strength of the pixel signal, and (2) an analog/digital converter configured to convert amplified signals into digitized signals;
a plurality of memory units configured to store digitized reference signal after the digitized reference signal has been generated by the signal processing unit such that the plurality of memory units respectively store the digitized reference signal for each gain from the variable gain amplifier; and
a correction unit configured to subtract the digitized reference signal for each gain stored in the plurality of memory units from the digitized pixel signal that has passed through the signal processing unit such that the vertical smear noise component of the digitized pixel signal is removed.

2. The solid-state imaging device according to claim 1, wherein the signal supply unit includes a switching element connected to the signal line, the switching element configured to selectively supply the reference signal to the signal line.

3. The solid-state imaging device according to claim 1, wherein the signal supply unit corresponds to the unit pixels in a shielded state when part of the pixel array unit is shielded.

4. The solid-state imaging device according to claim 3, wherein the signal supply unit corresponds to the unit pixels in an optical black pixel area provided in a shielded state at the periphery in the pixel array unit.

5. The solid-state imaging device according to claim 4, wherein the signal supply unit corresponds to the unit pixels in the optical black pixel area provided at one side of a periphery in the pixel array unit in the wiring direction of the signal line.

6. The solid-state imaging device according to claim 5, wherein the signal supply unit corresponds to a plurality of rows of unit pixels in the optical black pixel area, and the plurality of memory units hold average values of pixel signals of the rows of unit pixels.

7. The solid-state imaging device according to claim 4, wherein the signal supply unit corresponds to unit pixels in the optical black pixel area provided at both sides of the periphery in the pixel array unit in the wiring direction of the signal line.

8. The solid-state imaging device according to claim 7, wherein the signal supply unit corresponds to respective plural rows of unit pixels with respect to the optical black pixel area at the both sides of the periphery, and wherein the plural memory units hold average values of respective pixel signals of the respective plural rows of unit pixels.

9. The solid-state imaging device according to claim 5 or 7, wherein the signal supply unit corresponds to unit pixels in the optical black pixel area provided at one side of the periphery in the pixel array unit in the direction orthogonal to the wiring direction.

10. The solid-state imaging device according to claim 9, wherein the signal supply unit corresponds to plural columns of unit pixels in the optical black pixel area, and wherein the plural memory units hold average values of respective pixel signals of the plural columns of unit pixels.

11. The solid-state imaging device according to claim 5 or 7, wherein the signal supply unit corresponds to unit pixels in the optical black pixel area provided at both sides of the periphery in the pixel array unit in the direction orthogonal to the wiring direction of the signal line.

12. The solid-state imaging device according to claim 11, wherein the signal supply unit corresponds to respective plural columns of unit pixels with respect to the optical black pixel area at the both sides of the periphery, and wherein the plural memory units hold average values of respective pixel signals of the respective plural columns of unit pixels.

13. A signal processing method of a solid-state imaging device, the solid-state imaging device comprising (1) a pixel array unit in which unit pixels including photoelectric conversion elements are arranged in a matrix the pixel array unit configured to generate a first signal at the time of reset of a unit pixel and a second signal corresponding to electric charges obtained by the photoelectric conversion in the photoelectric conversion element of the pixel unit, and output the first and second signals to a signal line as a pixel signal, (2) a signal processing unit having a variable gain amplifier configured to amplify various signals including a plurality of gains each gain set in accordance with the strength of the pixel signal, and an analog/digital converter configured to convert amplified signals into digitized signals, the method comprising the steps of:

supplying a reference signal to the signal line;
passing the reference signal through the signal processing unit and storing a digitized reference signal in a plurality of memory units such that the plurality of memory units respectively store the digitized reference signal for each gain from the variable gain amplifier;
passing a pixel signal through the signal processing unit; and
subtracting the digitized reference signal for each gain stored in the plurality of memory units from the digitized pixel signal that has passed through the signal processing unit such that the vertical smear noise component of the digitized pixel signal is removed.

14. An imaging apparatus comprising:
a pixel array unit in which unit pixels including photoelectric conversion elements are arranged in a matrix, the pixel array unit configured (1) to generate a first signal at the time of reset of a unit pixel and a second signal corresponding to electric charges obtained by the photoelectric conversion in the photoelectric conversion element of the pixel unit and (2) output the pixel signal to a signal line;
a signal processing unit including (1) a variable gain amplifier configured to amplify various signals at a plurality of gains, each gain set in accordance with the strength of the pixel signal and (2) an analog/digital converter configured to convert amplified signals into digitized signals;
a signal supply unit configured to supply a reference signal to the signal line;
a plurality of memory units configured to store the digitized reference signal after the digitized reference signal has passed through the signal processing unit such that the plurality of memory units store a reference signal for each gain from the variable gain amplifier; and
a correction unit configured to subtract the digitized reference signal for each gain stored in the plurality of memory units from the digitized pixel signal after the digitized pixel signal has passed through the signal processing unit such that the vertical smear noise component of the digitized pixel signal is removed.

* * * * *